United States Patent

[11] 3,569,632

[72] Inventors Peter W. Beresin;
Frank W. Sieracki, Philadelphia, Pa.
[21] Appl. No. 8,145
[22] Filed Jan. 16, 1970
[45] Patented Mar. 9, 1971
[73] Assignee Ultronic Systems Corp.
Mount Laurel, N.J.
Division of Ser. No. 660,696, Aug. 15, 1967,
Patent 3,519,750

[54] SYNCHRONOUS DIGITAL MULTIPLEX COMMUNICATION SYSTEM INCLUDING SWITCHOVER
2 Claims, 20 Drawing Figs.

[52] U.S. Cl. .......... 179/15, 178/50
[51] Int. Cl. .......... H04j 3/08
[50] Field of Search .......... 179/15 (APR), 15 (Async.), 15 (AL), 2 (DP), 15 (Sync.); 178/50, 49.5

[56] References Cited
UNITED STATES PATENTS
2,912,508 11/1959 Hughes .......... 179/15(APR)
3,394,223 7/1968 De Witt .......... 178/50

*Primary Examiner*—Ralph D. Blakeslee
*Attorneys*—Norman J. O'Malley and Theodore Jay, Jr.

ABSTRACT: Multiplex messages are transmitted from a master station through a plurality of intermediate stations and back to the master via a main channel. A standby channel provides for transmission in the opposite direction. If a station detects received message failure in the main channel it initiates a switchover operation in which the preceding station switches received messages to the standby channel. The switched messages pass back through the master to the initiating station, and the initiating station returns them to the master via the main channel. Modem clock signals are switched to maintain synchronous operation and failure of a modem results in a switchover operation. Provision is made for operation alternatively at higher and lower bit transmission rates, while retaining the same message length. Special connections for predetermined message cells allow communication between intermediate stations.

INVENTORS
PETER W. BERESIN,
FRANK W. SIERACKI
Theodore Jungh
ATTORNEYS

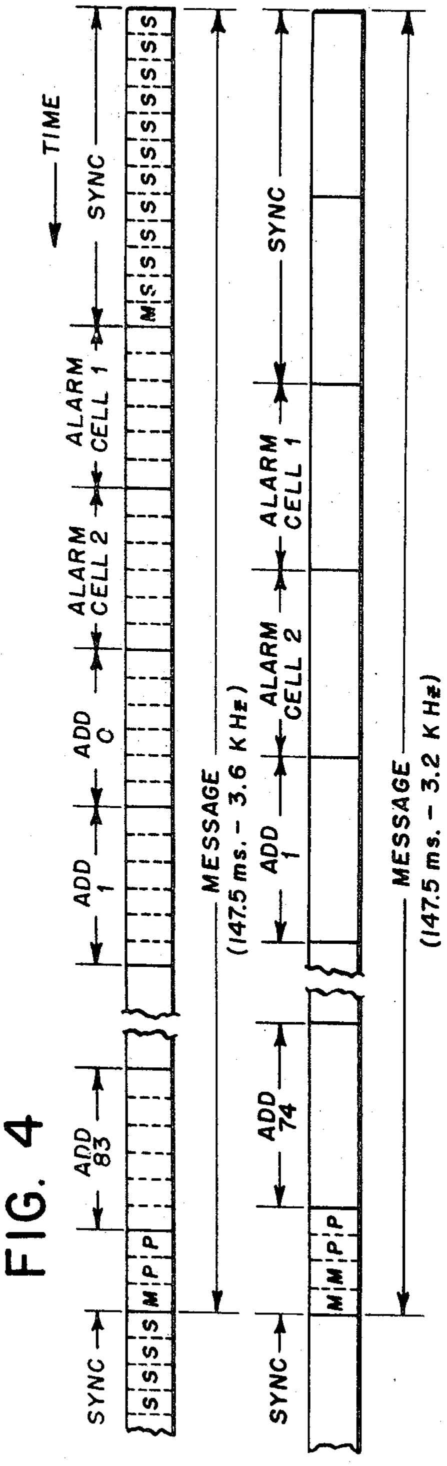
FIG. 4 (a) (b)
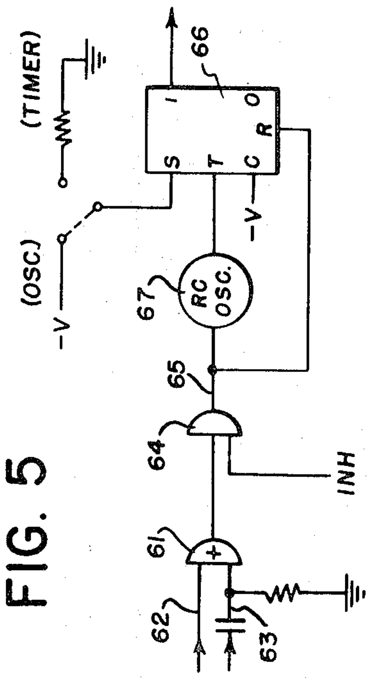
FIG. 5
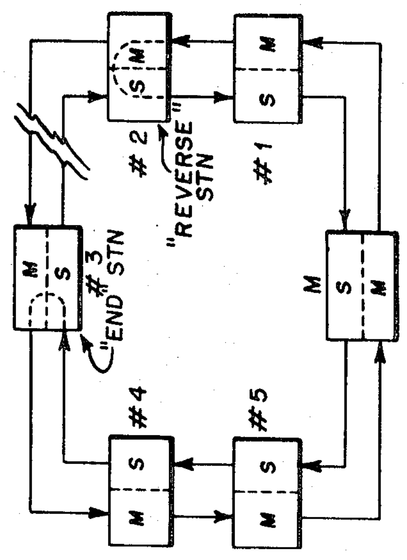
FIG. 2
INVENTORS
PETER W. BERESIN,
FRANK W. SIERACKI
Theodore Jay Jr.
ATTORNEYS INVENTORS
PETER W. BERESIN,
FRANK W. SIERACKI
Theodore Jay Jr.
ATTORNEYS

INVENTORS
PETER W. BERESIN,
FRANK W. SIERACKI

Theodore Jay Jr.
ATTORNEYS

INVENTORS
PETER W. BERESIN,
FRAN W. SIERACKI,
Theodore Jay Jr.
ATTORNEYS

INVENTORS
PETER W. BERESIN,
FRANK W. SIERACKI
Theodore [signature]
ATTORNEYS

INVENTORS
PETER W. BERESIN,
FRANK W. SIERACKI
Theodore Jay Jr.
ATTORNEYS

INVENTORS
PETER W. BERESIN,
FRANK W. SIERACKI
Theodore Jayhi
ATTORNEYS

INVENTORS
PETER W. BERESIN,
FRANK W. BIERACKI
Theodore Jay Jr
ATTORNEYS

INVENTORS
PETER W. BERESIN,
FRANK W. SIERACKI,
Theodore [signature]
ATTORNEYS

INVENTORS
PETER W. BERESIN,
FRANK W. SIERACKI.
Theodore Jay
ATTORNEYS

INVENTORS
PETER W. BERESIN,
FRANK W. SIERACKI,
Theodore Jay [signature]
ATTORNEYS INVENTORS
PETER W. BERESIN,
FRANK W. SIERACKI.
Theodore Jay Jr.
ATTORNEYS INVENTORS
PETER W. BERESIN,
FRANK W. SIERACKI,
[signature]
ATTORNEYS INVENTORS
PETER W. BERESIN,
FRANK W. SIERACKI.
Theodore Jay
ATTORNEYS INVENTORS
PETER W. BERESIN,
FRANK W. SIERACKI
Theodore Jay Jr.
ATTORNEYS

SYNCHRONOUS DIGITAL MULTIPLEX COMMUNICATION SYSTEM INCLUDING SWITCHOVER

CROSS REFERENCE TO RELATED APPLICATIONS

This application is a division of application Ser. No.660,696 filed Aug. 15, 1967, now U.S. Pat. No. 3,519,750.

BACKGROUND OF THE INVENTION

This invention relates to a synchronous digital multiplex communication system and provides main and standby channels for communication in opposite directions, with provision for switchover in case of a main channel failure which incorporates the standby channel in the transmission path while preserving synchronous data transmission.

Digital multiplex communication systems are known in which data transmitting and receiving circuits are synchronized with modems (or datasets) which convert digital messages from the transmit logic to suitable form for transmission via commercial communication channels such as long distance telephone lines, and convert received messages to suitable form for the receive logic. The synchronous operation facilitates using high bit transmission rates within limitations imposed by the bandwidths, phase characteristics, noise, etc. of the communication channels.

Failure of one line in communication channel due to disruption or high distortion may result in complete breakdown of the system. Switching to other communication channels around the link which has failed is not a satisfactory cure because of the synchronous operation.

Also, in cases where a high transmission bit rate near the channel limitation is employed, deterioration of one or more links, or abnormal conditions, may render communication unreliable.

The present invention provides a system in which reliable communication can be reestablished quickly and automatically upon failure of a transmission link between successive stations. Also provision is made for operation at a lower bit rate when circumstances require.

SUMMARY OF THE INVENTION

In accordance with the invention a master station and a plurality of intermediate stations are connected serially for transmission of messages from the master station through the intermediate stations and back to the master station in a main channel in one direction, and in a standby channel in the opposite direction. The messages are digitally-coded multiplex messages having an initial distinctive synchronizing (sync) pattern followed by a plurality of message cells each having a plurality of bit intervals for characters to be transmitted, and ending with a message parity section.

All message cells may be allocated to the master station for transmission and reception, and selected cells may be assigned to the intermediate stations. While other sources could be employed, conventional teletype equipment is here used. The system is designed to include transmission of updating stock quotation messages such as described in U.S. Pat. application Ser. No. 379,071, filed Jun. 29, 1964 by Peter W. Beresin for "Multiplexing System." The required number of message cells are allocated to such transmissions. If all intermediate stations do not require the stock quotation messages, the corresponding demultiplexing equipment may be omitted thereat.

Both main and standby channels contain transmit-receive modems. The standby channel at each station advantageously includes the same logic circuits as the main channel, so as to enable switching the standby logic to the main channel in case of malfunctioning. In normal operation only the main channel is used for communication. However the standby channel may be tested as required to make sure it is in satisfactory operating condition. The modems are adjusted properly for operation in the respective channel, taking into account the delay, frequency and phase characteristics of the telephone lines in that channel.

Provision is made at each station to detect received message failure, preferably both failure due to disruption and that due to high distortion. In either case the failure-detecting station initiates what is termed a "switchover" operation in which it sends out alarm messages in the main channel which result in the next preceding station (in the main channel) transferring its message transmission from main to standby channels. The station detecting the failure then transfers messages received in the standby channel to the main channel thereat. Provision is made to switch clock signals at both stations in such a manner that synchronous transmission in the switchover configuration can resume with minimum loss of time. The master station can also detect a received message failure and initiate switchover, and can serve as a preceding station.

To control the switchover operation, in the embodiment described hereinafter the multiplex messages have a plurality of alarm cells. A coded character is inserted therein to inform the master, as well as other stations, that a switchover is required, and the station address code is given. The mater station inserts the station address code of the next preceding station, and supervises the operation until it determines that switchover has been accomplished satisfactorily, or else has failed.

Message cell counters are employed at the stations to produce cell addresses which control multiplex and demultiplex operations. For the alternative operation at a lower message bit rate, the counters are advanced rapidly at predetermined counts thereof to effectively skip predetermined cell addresses. The skipping is predetermined to yield messages at the lower bit rate of the same length as at the higher bit rate. This greatly facilitates multiplex and demultiplex operations since the cells remaining in the lower bit rate messages may be treated the same as in the higher bit rate messages.

To enable operation at either bit rate, provision is made to perform the skip operation at the beginning of a cell interval. This is quickly followed by transfer of data from a register in the main channel to a demultiplex shift register for supplying data to TTY (teletype) outputs. A clock interval then follows during which data is shifted out of the demultiplex shift register and new data shifted into a multiplex shift register. The contents of the latter are then transferred to the main channel register. All these operations take place during the presence of a given cell in the main channel register, so that the skipping of cells does not interfere with them.

Although messages originate and terminate at the master station, a predetermined number of message cells are allocated to communication from any intermediate station to the others, as well as to and from the master station. For these cells, the master station retransmits received information originating elsewhere Means are provided for the originating station to clear the cells in the succeeding message arriving thereat.

Further features of the invention, and specific means for carrying out the above operations, will be described hereinafter in connection with the specific embodiment.

BRIEF DESCRIPTION OF THE DRAWINGS

FIG. 2 illustrates a switchover condition;

FIG. 4 shows message formats;

FIG. 5 shows a timer used in the detailed circuits;

FIGS. 10, 10A and 11, 11A show mux and demux buffer controls, respectively, at the master station;

DESCRIPTION OF THE PREFERRED EMBODIMENT

Figure 1:
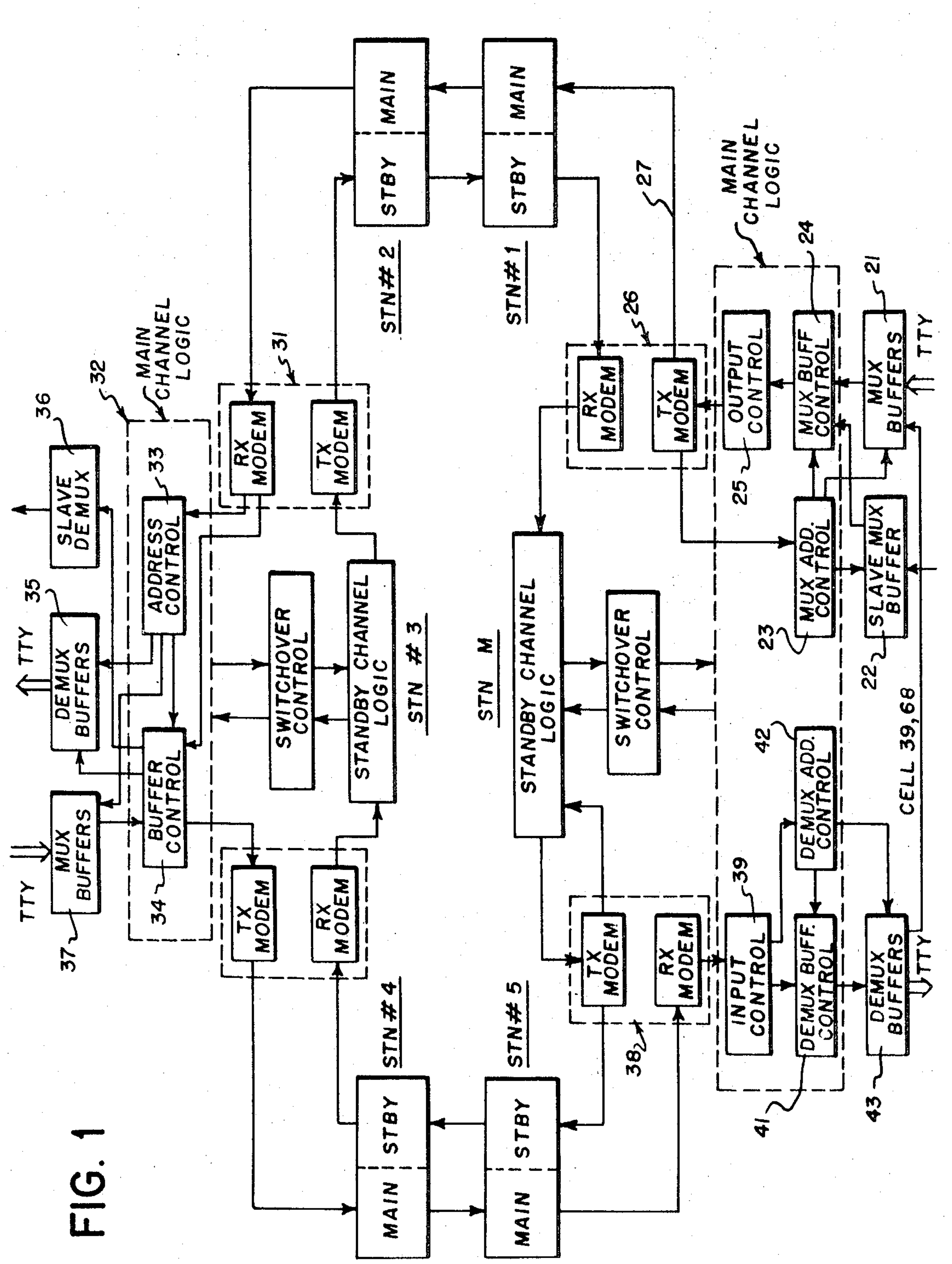
FIG. 1 is a block diagram of the system.

FIG. 1 shows a master station STN M and five intermediate stations STN01—05, connected serially for communication in one direction by a main transmission path, and in reverse direction by a standby transmission path. The stations may be in the same or different countries, and are connected by communication channels such as long distance telephone lines providing for independent transmissions in both directions. In normal operation only the main channel is used for communication, but test signals may be supplied to the standby channel to make sure it is operating properly.

Considering first the main channel, multiplex messages originate at the master station in the so-called mux circuits and travel through the intermediate stations in order. Although the types of data sources may be selected as desired, here teletype sources TTY are employed for general communications, and portions of each message are allocated to stock market and similar types of information. Individual mux buffers 21 are provided for each TTY, and a slave mux buffer 22 receives updating messages on stock quotations and the like. Message time cells are allocated to respective TTY sources and to the slave messages by the mux address control 23, and coded characters are supplied at the proper times to the mux buffer control 24. As a message is formed, it passes through the output control 25 to the transmitting portion T$x$ of a modem or dataset 26 to the communication line 27.

Selected portions of the messages may be allocated to information for all intermediate stations, and each station reads it out and passes it on to the next. Other portions may be assigned to a particular station, in which case the station deletes the received information and can then insert information in the same message cells for transmission on to the master station.

To this end, each intermediate station contains equipment such as is shown in detail for STN03. Messages enter the receive portion R$x$ of modem 31 and pass to the main channel logic 32. This has address and buffer controls 33,34 which supply information in the proper message cells to demux buffers 35 and slave demux 36. Buffers 35 are controlled to supply data from the proper message cells to the TTX receivers connected thereto. The slave demux assembles updating messages for a cyclic memory (slave) used to disseminate stock quotation information. Mux buffers 37 receive information from respective TTY transmitters and addresses from 33, and supply characters to the proper cells of a message as it passes through buffer control 34. The message then passes to the T$x$ modem and is transmitted to the next station.

After passing through the several intermediate stations, and being modified by transmissions originating thereat, the messages arrive at STN M and are supplied by the R$x$ modem in 38 to input control 39. The demux buffer control 41 receives the data, and demux address control 42 utilizes the message sync pattern to produce address control signals. Demux buffers 43 are jointly controlled by 41, 42 to supply information in the messages to respective TTY receivers.

Message cells may also be allocated to transmission from one intermediate station to the others. In this case provision is made at STN M to pass the information from demux buffers 43 to mux buffers 21, so that all stations can be served. Here, cells 39 and 68 are used, as indicated. A station transmitting in one of these cells is obligated to delete the information upon return to it. STN M may also transmit in these cells.

The number of Teletypes connected to any station can vary according to its needs, within maximum limits. Also, slave demux data may be required only at one or two intermediate stations.

The standby channel logic at the master and intermediate stations is that included within the respective dotted boxes. Mux, demux and slave buffers are not duplicated, although they could be if desired. Provision is made in practice for substituting standby logic for main logic in case of malfunctioning, but the switching circuits are not shown here to avoid further complexity. It is undesirable to switch modems from standby to main channels, since the modems in main and standby channels are initially adjusted to function properly in the respective channel, and commonly would require readjustment if changed from one to the other. The switchover operation takes care of modem failure at main and intermediate stations, as will be described.

FIG. 2 shows an example of failure in the main channel, and switchover operation. The station detecting a line failure condition is defined as the "end" station, and the preceding station is defined as the "reverse" station. It is assumed that a communication line disruption has occurred between stations 02 and 03. Station 03 recognizes the disruption by failure to receive message sync patterns in the main channel, and initiates a switchover operation by transmitting an alarm code and its station address in a message in the main channel to station M. Station 03 then switches its input from the receiving modem in the main channel to the receiving modem in the standby channel.

Upon detection of the alarm code, station M notes the end station address and transmits a message in the main channel containing the alarm code and the address of the next preceding station, in this case station 02. Station M also establishes a bypass of its standby logic so that all data received in the standby channel will be retransmitted. Upon detection of the message with its address, reverse station 02 switches its output from the transmitting modem in the main channel to that in the standby channel, and then replaces the system alarm code by its address in the messages. These messages travel through the standby channel to the end station and back to station M in the main channel, thereby indicating to M that switchover has been completed. Station M then replaces the reverse station address with a "switchover complete" code, thereby notifying all stations. Operation thereafter continues in the switchover mode. When the disruption between stations 02 and 03 has been repaired, normal operation can be restored manually.

Instead of complete disruption of a communication channel, high signal distortion may cause an excessive number of faulty messages to be received. In such case the switchover mode may be used until normal operation is restored. In the event of T$x$ modem failure at station 02, or R$x$ failure at station 03, switchover will be produced in the manner described, since either failure will result in cessation of messages at 03.

FIG. 3A illustrates a modem or dataset of the type here employed. It is a commercially available unit having a coder 51 and transmitter 52 in the T$x$ portion. The coder is designed to receive DC levels representing marks or spaces (or 1-bits and 0-bits) and convert them to AC signals for transmission via telephone lines. The receiver 53 and decoder 54 receive AC signals from the telephone lines and restore their original DC levels. Proper coding and decoding require clock signals synchronized with the data to be transmitted and received. Here the clock is internally generated by oscillator 55, yielding T$x$ CLK in line 56. This is normally applied to coder 51 via line 57 to clock the transmission. External connections in the logic are used between lines 56 and 57 to provide for switchover. In the master station the signal in line 57 is designated T$x$ DATA CLK to differentiate it from that in line 56. At an intermediate station, the clock in line 57 is derived from the R$x$ CLK thereat, and that in line 56 is not used.

Received signals, after travelling through the modems and logic of the intermediate stations, and the telephone lines, will vary in phase with respect to the local clock from oscillator 55. Also, it is necessary to maintain the clock oscilliations of all modems at the same frequency. Accordingly received signals are supplied to a control circuit 58 which adjusts the oscillator frequency to that of the received signals. The control circuit also produces a phase-corrected Rx CLK which is applied to a decoder 54 to effect proper decoding of the received signals.

FIG. 3B shows normal operation at the master station. The Tx CLK from modem 26 is the initial source of Mux clock pulses which control the Mux circuits to produce Tx DATA for transmission in the main channel. Tx DATA CLK is supplied to the Tx portion of modem 26 to control transmission to the telephone lines. Upon return of messages in the main channel, modem 38 supplies Rx DATA and Rx CLK to the Demux circuits. The standby channel has the same signal arrangement, except that transmission is in the opposite direction.

FIG. 3F shows normal operation at an intermediate station. The main channel is similar to FIG. 3B, except that Tx CLK goes to the Tx modem and there is no clock in the opposite direction. Thus the transmitting clock is frequency controlled by the received signal. The same is true of the standby channel.

The remaining FIGS. show the interchange of signals between main standby channels under various switchover conditions.

FIG. 3C assumes switchover has been required by an intermediate station SO REQ and shows the result at the master station. The standby logic is bypassed to deliver Rx DATA directly to the output as Tx DATA, and Rx CLK to the output as Tx DATA CLK, as indicated by the dotted lines. This is produced by a bypass signal from the main channel. The main channel functions as in B.

Since the logic in main and standby channels is the same, subsequent FIGS. will show only one logic. To identify signals from main to standby channels, and vice versa, a given signal will be designated OUT at the channel from which it comes, and IN at the channel to which it goes. Thus in FIG. 3C, BYPASS OUT from the main channel is BYPASS IN to the standby channel.

FIG. 3D shows the master station serving as an end station. The Rx input to the main channel is assumed disrupted, either by line or modem failure. Tx in the main channel is as before. However, Rx DATA and Rx CLK signals are now fed from the standby to the Demux logic of the main channel. The arrows from the standby logic to the standby Tx modem are still shown, but are unlabeled since they do not participate in switchover communication. They can be used for test and monitoring purposes.

FIG. 3E shows the master station serving as a reverse station. Here the Tx clock in the standby channel is used for main channel transmission, since a failure of the main channel Tx clock may be the cause of switchover. Tx DATA is supplied to the standby channel for transmission. The necessary switching is controlled by the Monored signal from the main Demux logic to the standby logic.

FIG. 3G shows an intermediate station serving as an end station. The main channel Rx circuits are shown disrupted. After switchover the main channel logic receives Rx DATA and Rx CLK from the standby Rx modem.

FIG. 3H shows an intermediate station serving as a reverse station. Tx DATA and Tx CLK are supplied from main to standby channels for transmission, under the control of the reverse signal REV.

Intermediate stations not serving as end or reverse stations are not shown, since their main channels function normally, and their standby channels function simply to pass messages from the reverse station to the end station as shown in FIG. 2. In this embodiment the messages pass through the standby logic, but are not altered thereby since no Mux or Demux buffers are connected thereto. If desired, provision could be made to bypass the standby logic under switchover conditions.

It will be noted from FIG. 3B that the Tx and Rx portions of modem 26 are in main and standby channels, respectively, and the reverse is true of modem 38. This is advantageous over what would be a normal arrangement wherein the Tx and Rx portions of the same modem serve a given channel. In the latter case a failure of the modem would disrupt the entire channel. With the arrangement shown, a failure in modem 26 will cause switchover making M a reverse station, and a failure in modem 38 will make M an end station. The same is true for an intermediate station. Further, from FIG. 3A it will be understood that the Tx oscillator in the main channel of modem 26 will be frequency corrected by received signals in the standby channel, and vice versa for modem 38. Thus the two oscillators will normally be at substantially the same frequency. Therefore if M becomes a reverse station as in FIG. 3E, and the standby Tx clock is used, less time is required for the channels to settle down in their switchover mode of operation.

FIG. 4 shows the message format. Two different bit rates are provided for, in case of variation in transmission line quality. FIG. 4*a* has a 3.6 kHz. (kilohertz) rate and the message length is 147.5 milliseconds. The message has 88.5 cells, each cell having six bits. The first two cells contain the sync pattern, which is 11 spaces followed by a mark. This is followed by alarm cells 1 and 2, used for switchover. The next 84 cells are for data transmission, and are denoted ADD 0 (address) through ADD 83. The final half-cell has two bit positions for parity, and a final mark to insure that a mark precedes the spaces of the next sync pattern.

The 3.6 kHz. bit rate requires a high quality telephone line for reliable communication. Although such lines are available, upon occasion lines may fail to meet specifications and a lower bit rate may be necessary. FIG. 4*b* has a 3.2 kHz. bit rate and the same message length, yielding 78⅔cells. This is obtained by omitting 10 address cells from FIG. 4*a*. The final two-thirds cell now contains two parity bits followed by two marks. To change from the higher message rate to the lower, the modems are readjusted manually to the lower frequency, and skip address circuits are placed in operation at all stations.

The logic diagrams shown in subsequent FIGS. use digital logic elements. Many types of elements are known in the art and may be used as desired to perform the functions hereinafter described. The specific embodiment here shown uses NOR logic units extensively, examples of which are given in U.S. Pat. No. 3,281,788, FIGS. 6—8. Their functioning will be described at this time to facilitate understanding the diagrams.

Figures 8, 9:
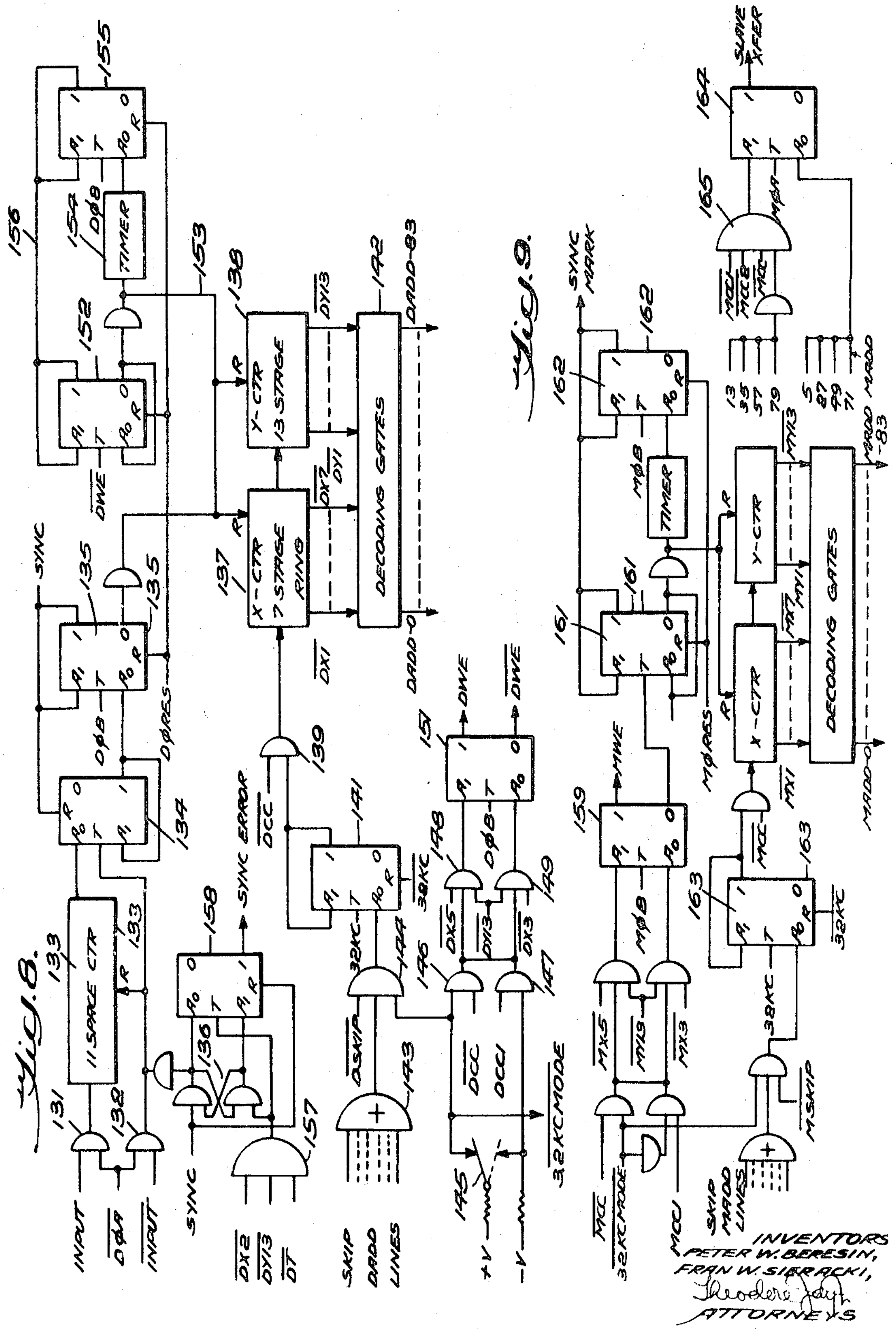
FIGS. 8 and 9 show demux and mux address controls, respectively.

A gate such as shown at 131 in FIG. 8 has a plurality of inputs and one output. If any input line is high (say ground potential), the output line is low (say negative). If all input lines are low, the output line will be high. Thus, the gate functions as an AND gate with polarity inversion for input signals whose assertion levels are low, and as an OR circuit with inversion for signals whose assertion levels are high. An OR use is indicated by + as at 143. If only one input line is used and the others left unconnected, the gate functions as a polarity inverter.

Two such gates may be cross-connected as shown at 136 to form a DC flip-flop. A high input signal to either side (with the input to the other side low) will cause the output of that side to go low and the output of the other side to go high. The terms "set" and "reset" will be used hereinafter to designate the two possible states of the flip-flop, an are selected arbitrarily as seems convenient.

An AC flip-flop such as shown at 158 in FIG. 8 is a bistable multivibrator having steering inputs AO and A1, and outputs 0 and 1. The FF is triggered by a positive-going signal to the T input and reset by a high signal to the R input. In the reset state the O output is high and the 1 output low. In the set state the outputs are reversed. If the steering inputs are high to A0 and low to A1, a trigger signal will set the flip-flop. If the steering inputs are low to A0 and high to A1, a trigger signal will reset the flip-flop. A shift register such as the Mux Transfer Register in FIG. 10 may be constructed of a number of AC flip-flops interconnected in known manner. Counters may also be made of AC flip-flops in known manner.

Both barred and unbarred signals are shown in the drawings, and are the inverse of each other. Usually the assertion level of an unbarred signal is high, and that of a barred signal is low. One signal may be obtained from the other by passing it through an inverter, or both outputs of a flip-flop may be used to provide the two signals, etc.

Certain portions of the logic here used employ integrated circuit elements either for increased speed of operation or for economy. These are commercially available and only their overall functioning need be described. Bias circuits are omitted for simplicity. Gates function similarly to those already described, and are depicted in the same manner. However, AC flip-flops are somewhat different. One is shown at 91 in FIG. 6 and has steering input S (set) and C (clear). The FF is triggered by a negative-going signal to the T-input, and is cleared or preset by a high signal to P. In the preset state the O output is high and the 1 output is low. In the set state the outputs are reversed. If the steering inputs are high to S and low to C, a negative trigger to T will set the FF. If low to S and high to C, a negative trigger will clear the FF to its present state. This is similar to the preceding flip-flop except for polarity of trigger. However, if both S and C are held low, the FF will toggle to opposite states on successive triggers. If both S and C are held high, no toggling will take place.

FIG. 5 shows a circuit used as a timer in subsequent FIGS., and in certain instances as an oscillator. OR61 has a DC input 62 and an AC input 63. Either may be used as required. If either input goes high, the output will be low to gate 64. If INH is high it will inhibit gate 64. If low, the output of gate 64 in line 65 will go high to reset FF66, yielding a low 1 output. When the input line 62 or 63 goes low, line 65 will go low to release FF66 and allow RC oscillator 67 to start oscillating and periodically apply negative triggers to FF66. As an overall oscillator, the steering inputs S and C are both negative. The oscillator will therefore toggle the FF each time its output goes negative, making the 1 output alternately high and low. Normally the initial period of the oscillator is somewhat longer than subsequent periods. As a timer, input S is returned to ground (high), thereby steering it toward set. At the end of the initial period of the oscillator, FF66 will be set and its 1 output will go high, remaining high until the FF is reset by a high input signal.

Overall, a high input signal causes the 1 output to go low. When the input signal goes low, the output will remain low for a timing interval depending on the oscillator time constant, and then will go high. If the input goes high again, before the timing interval has expired, the output remains low. In the oscillation mode the output will go alternately high and low until the input signal goes high to reset FF66. By changing the time constants of RC oscillator 67, various timing intervals and overall oscillation periods may be obtained.

Many signals used in earlier FIGS. are developed in later FIGS. Usually their functioning will be described as they are used, leaving detailed development until later.

Figures 6, 7:
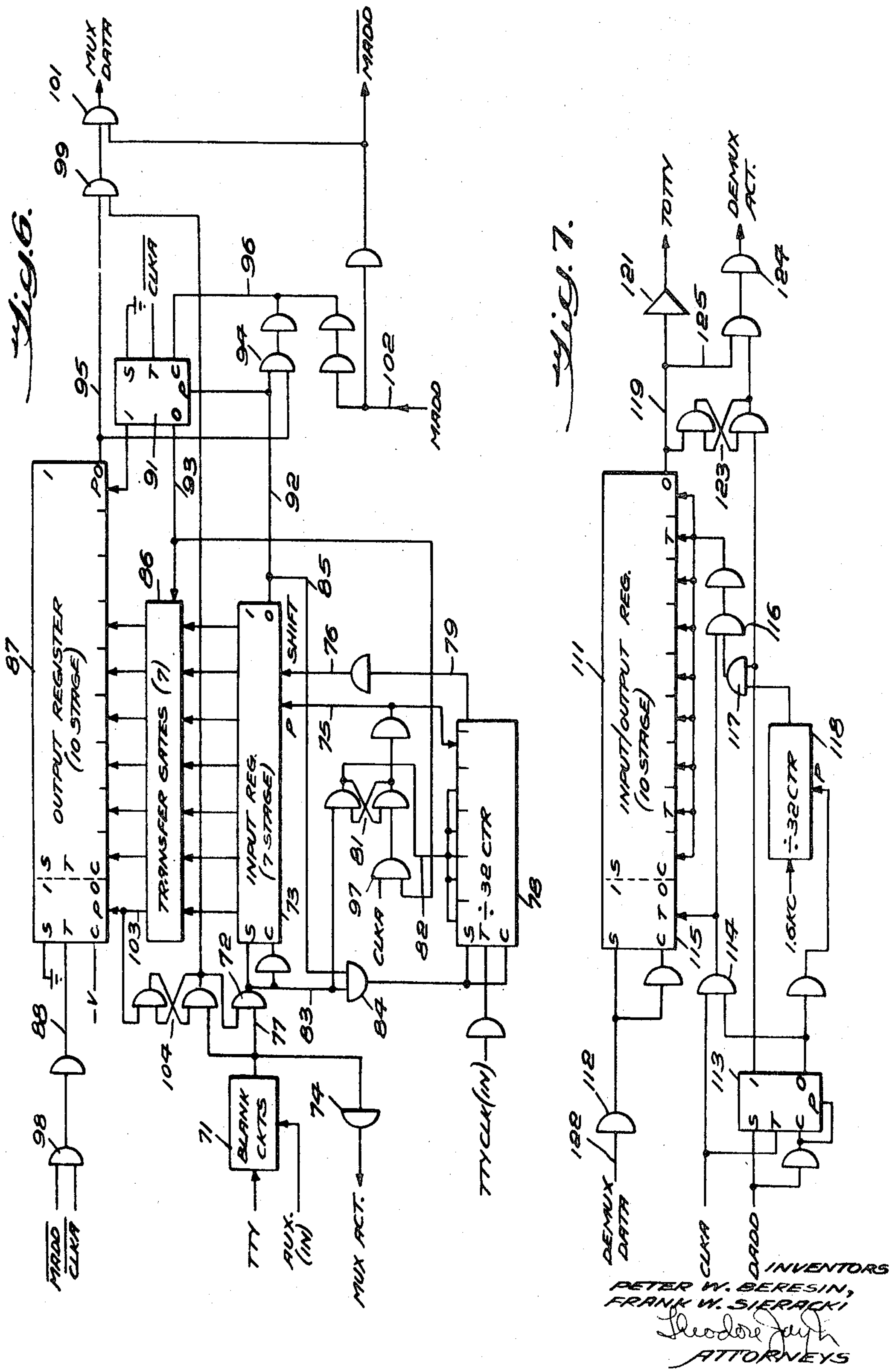
FIGS. 6 and 7 show mux and demux TTY buffers, respectively.

FIG. 6 shows a Mux TTY input buffer, one of which is provided for each TTY transmitter unit at each station. A standard five level, 50 baud TTY source is employed, each character having five data bits preceded by a start space and followed by a stop mark. For the multiplex message, the five data bits are inserted in a cell allocated to the particular TTY, and a sixth parity bit is added.

The TTY characters are applied to blanking circuits 71 which can be blanked, if desired, by an AUX in signal. The TTY data is then applied through gate 72 to input register 73, and also to inverter 74 to form MUX ACT (active) to indicate the particular buffer is in use. Register 73 has seven integrated circuit flip-flop stages with steering inputs S, C of the input stage shown. The present inputs P of all stages are connected to line 75, and the trigger inputs T are connected to shift line 76. The polarities are selected so that line 77 is high for a mark or 1-bit and low for a space or 0-bit. The inversion in gate 72 makes S high for a space, and this is inverted and applied to C. Consequently, spaces will set the stages (upon shifting), and marks will leave them cleared.

Counter 78 is a five stage counter for producing shift pulses for register 73. The TTY CLK IN signal is a 1.6 kHz. train of pulses which is divided by 32 to yield 50 Hz. shift pulses in output line 79. Input control FF81 is reset by a previous operation, making line 82 high to preset the first four stages of the counter. The other FF output will be low, and is inverted to a high in line 75 which presets the last counter stage and also the input register.

When a start space arrives, line 83 will go high, thereby setting FF81 and releasing the presets on counter 78 and register 73. The output of gate 84 will go low, thereby steering the input stage of counter 78 for toggling. Accordingly the counter will start shifting the TTY character bits into register 73. When the start space reaches the output stage, the O output will go low to line 85 leading to gate 84. If at this time a stop mark is present at the register input, line 83 will go low and the output of gate 84 will go high to stop the counter.

The TTY character is now in register 73, ready for transfer in bit parallel by gate 86 to output register 87. The latter has 10 stages connected as a shift register. The trigger inputs are connected together and to line 88 for shifting. The transfer gates are connected to respective P inputs of the first seven stages. The S,C inputs of the first stages are steered toward set, so that after a shift-out all stages are set. Consequently the transfer gates need only preset the proper stages in accordance with the data bits in register 73.

FF91 controls character transfer. With register 73 initially preset, the high 0 output in line 92 presets FF91. The resultant high 0 output to line 93 inhibits gates 86. With a character in register 73, the start space makes line 92 low, releasing FF91 and enabling gate 94. After a shift-out of output register 87, line 95 will be low, the output of gate 94 will be high, and the latter is inverted to make line 96 low. This steers FF91 to be set by a $\overline{\text{CLK}}$ A pulse. CLK A is a group of 10 pulses occurring at a 32 KC rate during each multiplex message cell time (FIG. 17*h*). The setting of FF91 makes line 93 low to enable gate 86 and the character is transferred to the output register. The low line 93 will enable gate 97, and the trailing edge of a CLK A pulse will make the gate output high to reset FF81. This presets the input register and counter 78, and line 92 goes high to preset FF91. Accordingly the input circuits are ready to receive another TTY character.

When FF91 was set, its high 1 output preset the output stage of register 87, thereby marking line 95 high to inhibit gate 94 and prevent a further setting of FF91 until the character in register 87 has been shifted out.

Mux address signal $\overline{\text{MADD}}$ to gate 98 goes low when the proper address cell is present in the multiplex message. This enables the corresponding 10 $\overline{\text{CLK A}}$ pulses to shift out register 87. The first three bits to gate 99 will be a space and two marks, and the seven TTY bits will follow. These phase through gate 101 to form MUX DATA. During the shift-out $\overline{\text{MADD}}$ to line 103 will be high, and is inverting to form MADD for gate 98 to enable gate 101. MADD is double inverted to make line 96 high and prevent FF91 from being set, thereby preventing a TTY character transfer during the shift-out.

If the character transferred to the output register should contain a space in the stop bit position, it is invalid and usually indicates an open TTY line. In such case line 103 will be high to preset the input stage of register 87. High line 103 will set FF104, making line 105 high to inhibit gate 99 and cause all spaces to be transmitted during shift-out. It will also inhibit gate 72, thereby blocking the input to register 73. TTY lines commonly mark between characters, and the arrival of a mark will reset FF104 and allow operation to resume.

Gate 84 has an additional important function. Normally TTY characters are available at 150 millisecond intervals, and the 147.5 msec. interval of the MUX messages is more than sufficient to keep up with the TTY. However, in some applications TTY characters may arrive at nominally 147.5 msec. intervals from an independent network (not here described). Due to tolerances, upon occasion a new TTy character may be present in register 73 before the previous character has been shifted out of register 87. To prevent another shifting which might result in erroneous data, gate 84 inhibits counter 78 whenever a character is in 73 until a new space arrives to make line 83 high. This allows maximum time for transfer of a character before a new character is shifted into register 73.

FIG. 7 shows a Demux TTY buffer, one of which is used for each TTY receiver. A 10 -stage Input/Output register 111 is supplied with Demux data (FIG. 17*j*) through an inverter 112. The register is shifted at high speed by CLK A pulses during input from the Demux buffer control, and at low speed during output to a TTY, under control of FF113. For high speed input, FF113 is steered by the DADD (Demux Address) allocated to the particular TTy, and is set by a CLK A pulse. The low 0 output enables gate 114 to pass CLK A pulses to trigger the input stage 115, and through gate 116 and an inverter to trigger the remaining stages. The high 1 output of FF113 inhibits gate 117 so that its output to 116 is low. Thus the Demux data is shifted until the start space arrives at the output stage.

The low speed clock for TTY output is a 1.6 kHz. square wave supplied to counter 118 to produce a 50 Hz pulse output to gate 117. While FF113 is set, its inverted 0 output holds counter 118 preset. When DADD goes low, the inverted high to P presets FF113 making its 0 output high. This inhibits gate 114 to terminate high speed shifting, and releases counter 118. Gate 117 is now enabled and passes low speed shift pulses to register 111 to shift the contents to output line 119 and to the TTY via an amplifier 121.

Marks are low at line 122 and high at the S input of register 111. In the absence of Demux data the S input will be high and stage 115 set to a mark. Consequently stage 115 will steer the next stage to a mark after the Demux data has been entered. As the data is shifted out to the TTY, all stages will be set to marks and a continuous mark output will be sent to the TTY until new data arrives.

A start space in the output stage will cause line 119 to be high, thus setting FF123 and making its output to OR124 high. The output of 124 will go low and is inverted to yield a high DEMUX ACT signal indicating the buffer has a character for the TTY. When the character has been shifted out, line 119 will go low. When FF113 is set during the next occurrence of its DADD, the high 1 output resets FF123, causing DEMUX ACT to go low. If no Demux data enters the register, the signal will stay low. If data is entered, a start space will repeat the operation. Line 125 to gate 124 insures that DEMUX ACT will be high whenever line 119 is high for spaces, such as an open line condition.

The detailed explanation of FIGS. 6 and 7 will serve to explain to those skilled in the art the manner in which the circuit elements function, and it is believed that in subsequent FIGS. a less detailed explanation will suffice.

FIG. 8 shown a Demux address control used at the master station. INPUT to gate 131 is a received multiplex message in which spaces are low, and in $\overline{\text{INPUT}}$ to gate 132 marks are low. The gates are stroked in the middle of the bit intervals by $\overline{\text{D}\Phi\text{A}}$ pulses (FIG. 17*d*). Spaces advance counter 133 and marks reset it. Upon occurrence of eleven spaces, FF134 is steered to be set by the next mark through gate 132, thereby recognizing the sync pattern. This steers FF135 to be set by the next DΦB pulse (FIG. 17*c*). which occurs at the beginning of a bit interval, thereby producing a high SYNC. The low 0 output is inverted and resets an address generator composed of X and Y counters 137, 138. The X-counter is a seven stage ring counter having out lines $\overline{\text{DX1}}$—$\overline{\text{DX7}}$. At each X cycle the 13 stage Y-counter is advanced one count, yielding a corresponding output in one of lines DY1—DY13. The X-counter is triggered by $\overline{\text{DCC}}$ pulses through gate 131 and by skip pulses from skip FF141. $\overline{\text{DCC}}$ (FIG. 17*f* inverted) goes low at the beginning of each message cell interval, so that the counter counts message cells. Decoding gates 142 use combinations of X and Y signals to produce Demux addresses DADD—0 ($\overline{\text{DX4}}$, $\overline{\text{DY1}}$) through DADD—83 ($\overline{\text{DX3}}$, $\overline{\text{DY13}}$).

For 3.2 kHz. operation (FIG. 4*b* ) certain cells are to be skipped. In practice these are distributed throughout the message and are, specifically cells 0,2,3,4,24,25,47,48,69,70. The corresponding DADD lines are connected to OR143 and the output supplied to gate 144. Switch 145, in the position shown, inhibits gate 144 and is for 3.6 kHz. operation. In the dotted position the inhibition is removed $\overline{\text{D SKIP}}$ (FIG. 17*g* inverted) goes low near the beginning of each cell interval, thus steering FF141 to be set by a 32 KC pulse at each occurrence of a skip DADD to $\overline{\text{OR143}}$. The setting of FF141, and immediate resetting by $\overline{\text{32KC}}$, delivers a positive-going pulse to gate 139 which advances the *X*-counter and its trailing edge. The maximum number of consecutive skips is three (cells 2—4), and occurs very quickly in three 32 kHz. cycles within a single skip interval.

In either position of switch 145, one or the other of gates 146,147 is enabled. The gate outputs are connected together, and if either output is high it forces the other high. A work end signal DWE is developed to determine the end of a message. Due to the shifting operation, both 3.6 and 3.2 kHz. messages (FIG. 4) end during the same X—Y count, but the last partial cell has three bits and four bits, respectively. Gates 146,147 operate for 3.2 and 3.6 kHz. respectively. DCC1 to gate 147 is low during bits 1 and 2, and high during bit 3. $\overline{\text{DCC}}$ to gate 146 is low during bits 1—3 and high during 4—6.

Considering 3.6 kHz. operation, gate 149 is enabled by $\overline{\text{DX3}}$, $\overline{\text{DY13}}$ corresponding to a count of 86. When DCC1 goes high during bit 3, the low output of 147 enables 149, and work end FF151 is set by the next DΦB pulse at the end of bit 3, making DWE high at a count of 86.5. In a similar manner $\overline{\text{DX5}}$ to gate 148 causes FF151 to be reset at a count of 88.5. For 3.2 kHz. operation, the corresponding counts are 86⅔ and 88⅔⅔. The subsequent explanation will assume 3.6 kHz. operation.

Since the X—Y counters were reset at the end of the sync pattern, the count of 86.5 should correspond to the beginning of a new pattern and 88.5 to a new SYNC signal. DWE goes high at count 88.5 and sets FF152, thereby resetting the counters through line 153 if SYNC does not do so. FFs135, 152 (and 155) are reset by DΦRES (FIG. 17*e*) which occurs after each ΦA and ΦB pulse. The inverted 0 output pulse starts timer 154 which is adjusted so that its output goes high 300 msec. after the pulse input, unless another high input is applied. This steers FF155 to be set by DΦB, forcing a setting of FF152 through line 156 an thereby resetting the X—Y counters. Thus a temporary failure of the counters to produce DWE is corrected.

Look-for-Sync FF136 is set by gate 157 just prior to a work end by the signals shown. If SYNC arrives thereafter, it resets FF136 and space counter 133. Otherwise when gate 157 is again operated, FF158 is set to produce a high SYNC ERROR. If a new SYNC is then produced, it resets FF158.

FIG. 9 shows the Mux address control at the master station. It is similar to FIG. 8 except that sync detection circuits are not required. Here "M" for Mux rather than "D" for Demux is used to designate the signals. The X,Y counters and decoding gates give MADD—0 through MADD—83 address signals. The input $\overline{\text{3.2 KC MODE}}$ is low for 3.2 kc. operation and high for 3.6 kc. operation. In either case, MWE is produced by FF159 like FF151 in FIG. 8. FF's 161,162 function like FF's 152,155 to reset the counters. When FF161 is set at the end of MWE, a high SYNC MARK is produced. FF163 functions like skip FF141.

Message cells 5—13, 27—35, 49—57 and 71—79 are here used for transmitting updating stock market information. MADD lines for the initial cells in each group are collected and used to steer FF164 to be set by MΦA, thereby making SLAVE XFER high. The last cells in each groups are collected. inverted, and applied to gate 165. The MCC inputs to gate 165 enable the gate during the last bit of the last cells (not required for slave messages) and reset FF164.

Figure 10:
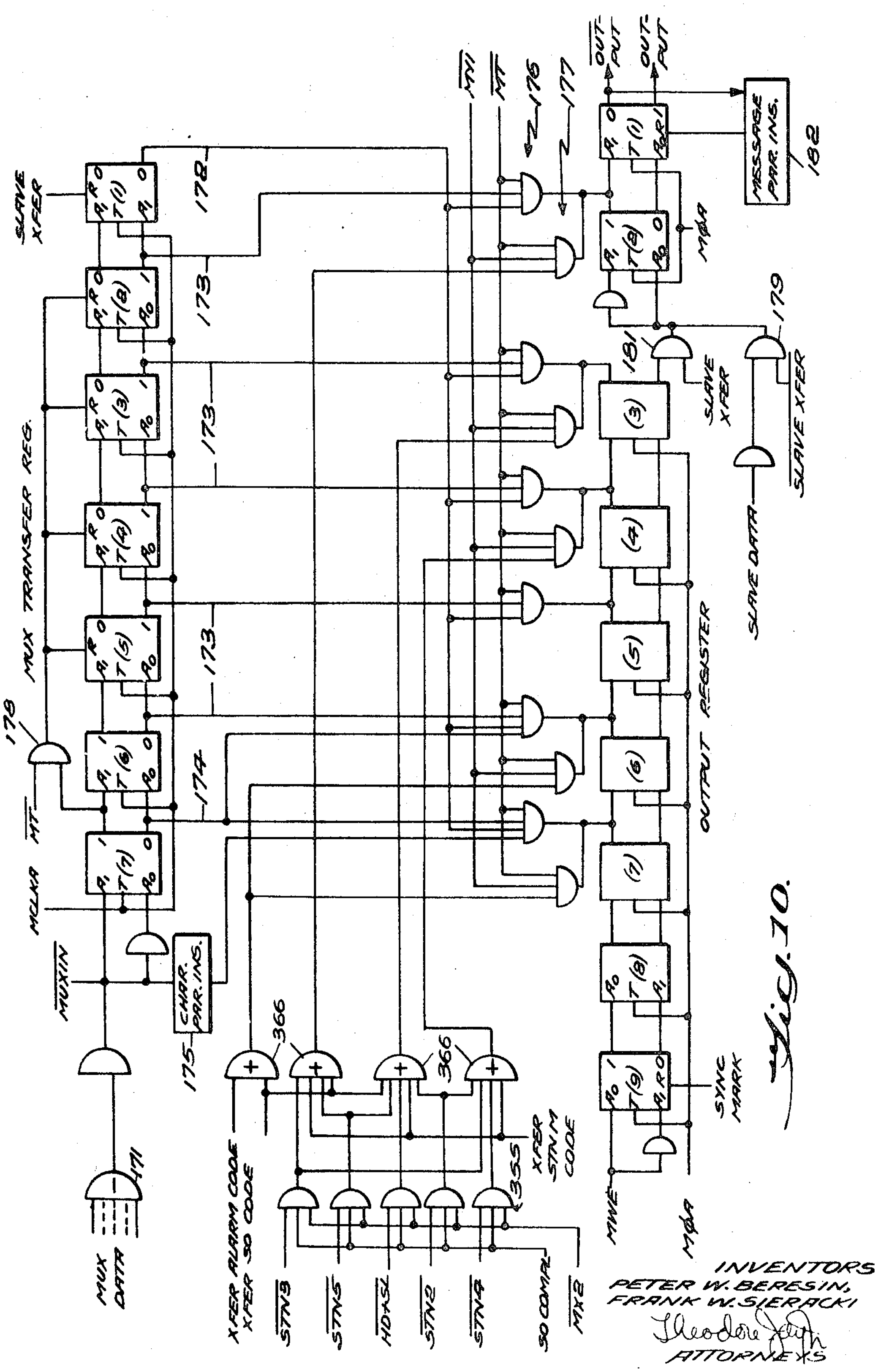

FIG. 10 shows the Mux buffer control at the master station. Mux data lines from the TTY Mux buffers (FIG. 6) are applied to OR171, inverted, and applied to stage 7 of the Mux transfer register. Due to the individual addressing of the TTY buffers, the MUX DATA lines will be active one at a time. The Ao input of stage 7 will be high for a mark or 1-bit. Shifting is by MCLKA pulses, which are in groups of 10 pulses near the beginning of each cell (FIG. 17*h*). When a character has been shifted in, the start space will be in stage 1 and the stop mark in stage 7. Certain stages are inverted to facilitate resetting and gating. The arrangement is such that line 172 will be low for a start space, lines 173 will be high for data 1-bits, and line 174 will be low for a stop mark.

As the data bits enter, they are supplied to a character parity inserter 175 designed in known manner for odd parity. That is, if the number of data 1-bits is even, the inserter generates a 1-bit for the sixth bit position in a cell.

Before describing transfer, the output register will be described. This is a nine stage register with MWE (FIG. 9) applied to the steering inputs of stage 9, and shifted by MΦA. the output stage 1 is inverted to supply proper polarity signals to the output circuits as modem. Reset of stage 1 corresponds to a space or 0-bit.

Two cells of sync are transmitted first. MWE is high for these cells and shifting produces 0-bits in the output line. SYNC MARK occurs at the trailing edge of MWE and before the next shift pulse, and resets stage 9 to insert a 1-bit for the end of the sync pattern. When MWE goes low, the steering of stage 9 is reversed and all stages are reset as the sync is shifted out, corresponding to 1-bits. At the beginning of the data cells, including the alarm cells, the 12th sync bit will be in stage 3 when the address counter advances.

If TTY data were then present in the transfer register, it could be inserted in output stages 4—9. However, this would require loading the transfer register during the previous cell time. With the above-described provision for alternatively using all address cells for 3.6 kHz. operation, and skipping certain cells for 3.2 kHz. operation, such loading would involve considerable complication. In this embodiment, provision is made to transfer TTY data to the transfer register during the first 2-bit intervals of the corresponding message cell, during which the 12th sync bit will be shifted to stage 1, and then transfer the TTY data to stages 2—6.

FIG. 17*f* shows the character control waveform CC, which is high for the first three bits of a cell and low for the remaining three bits. The ΦB pulses in *c* occur at the beginning of each bit interval, and serve as a reference. SKIP in *g* occurs during the first bit interval, and is followed by CLK A in *h* which extends into the second bit interval. If skipping is required it occurs first. Then the Mux Transfer Register is loaded by CLK A as already described. The mux transfer pulse MT occurs at the beginning of the third bit interval, as shown at *m*.

Gates in upper row 176 are for TTY transfer and those in lower row 177 are used for switchover. $\overline{MT}$ enables all gates at the proper transfer time. Line 172 enables the upper row if a start space is in stage 1 of the transfer register. Lines 173 transfer spaces as required from stages 2—6 of the transfer register to corresponding stages of the output register by making the 1 outputs of the latter high to force a set. A parity bit, if required, is transferred from 175 to stage 7. Continued shifting of the output register delivers the data cell to the output line, a new transfer is effected, and the operation repeated.

If a TTY line is open, all spaces will be delivered to the transfer register. To avoid possible confusion with the sync pattern, an open code is transmitted in the multiplex message as four 0-bits followed by two 1-bits, odd parity being disregarded. A space in stage 7 of the transfer register indicates an open code, and line 174 will go high to inhibit the transfer gates to stages 6,7 of the output register and leave marks therein. The low 1 output to gate 178 will allow $\overline{MT}$ to reset stages 2—5, making the corresponding output lines 173 low to force stages 2—5 of the output register to 0-bits.

For transmission of slave data, this is delivered (by means not shown) at multiplex message bit rate through gate 179 to stage 2 of the output register. SLAVE XFER (FIG. 9) inhibits gate 181 to isolate stages 3—9, and the inverse enables gate 179 for the slave transfer.

The output bits are counted in a message parity inserter 182, and stage 1 reset as required for parity insertion at the end of each message.

The remainder of FIG. 10 relates to switchover operation and will be discussed later.

Figure 10A:
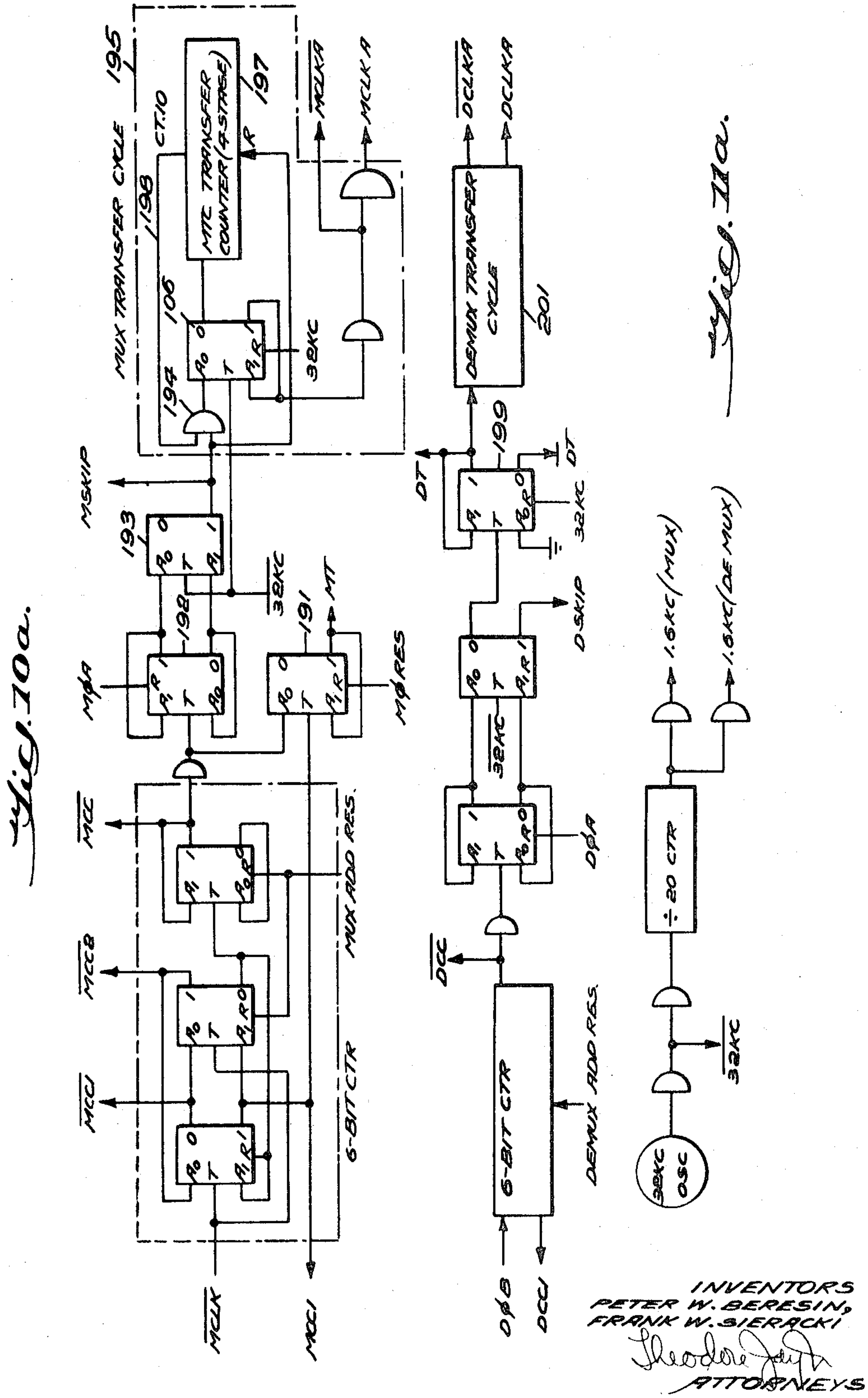

FIG. 10*a* shows the development of certain signals used in FIG. 10 and elsewhere. A 6-bit counter counts $\overline{M\ CLK}$ signals obtained from Tx CLK signals as will be explained in (FIG. 16), They have the timing shown in FIG. 17*b*. The counter is reset when the Mux address X–Y counters of FIG. 9 are reset, and thereafter repeated counts 6 -bits for successive cells. $\overline{MCC}$ is low for three bits (FIG. 17*f* inverted) and is inverted to a high at Ao of FF191. MCC1 goes high at the beginning of the third bit and triggers FF191 to make MT high. The FF is promptly reset by the next MΦRES yielding the MT pulse of FIG. 17*m*.

When $\overline{MCC}$ goes low at the beginning of each cell, its inversion sets FF192 and steers FF193 to be set when $\overline{32\ KC}$ next goes high. FF192 is reset by the next MΦA pulse and FF193 is reset shortly thereafter, yielding an M SKIP pulse shown in FIG. 17*g*.

When M SKIP goes low, it enables gate 194 in the Mux Transfer Cycle control 195 and steers FF196 toward set. The FF is repeated set by $\overline{32\ KC}$ and reset by 32 KC, and the resultant pulses at its 0 output are counted in 197. After 10 pulses have been counted, line 198 goes high to inhibit gate 194 and stop the counter. When M SKIP again goes high, it resets the counter and the cycle repeats. The 1 output of FF196 is inverted to form $\overline{MCLKA}$, and again inverted to form MCLK A. The result is 10 pulses for each message cell with the timing shown in FIG. 17*h*.

Figure 16:
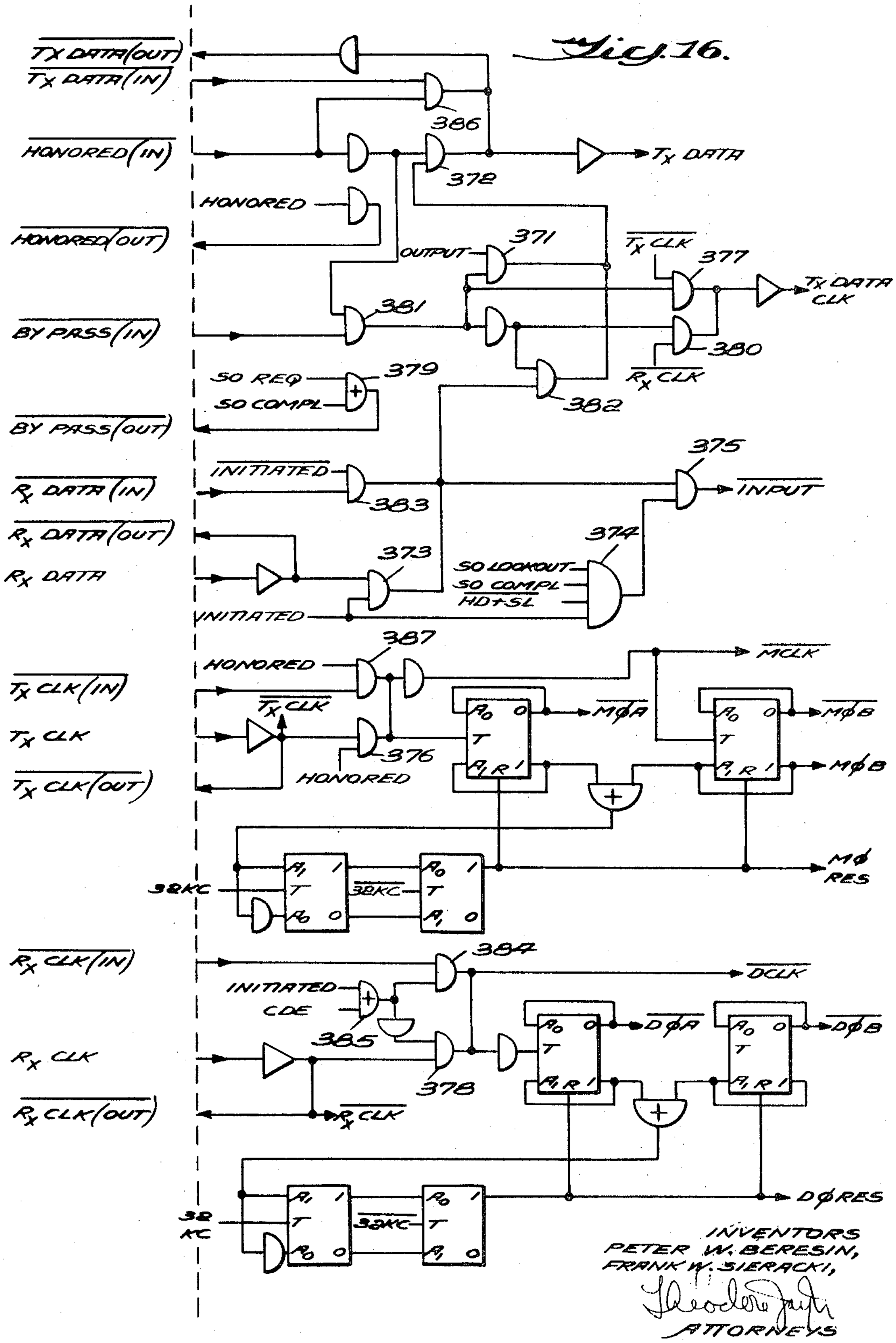

FIG. 11*a* is a similar timing circuit in the Demux buffer control at the master station. Here DΦB pulses (FIG. 17*c* ) are counted since they occur at the beginning of each received message cell. They are derived from the R*x* clock (FIG. 16). D SKIP is produced like M SKIP. However FF199 is triggered by the skip FF so that DT occurs immediately after D SKIP, as shown in FIG. 17*k*. The Demux Transfer Cycle 201 functions like 195 to produce DCLKA.

FIG. 11*a* also shows the production of 1.6 KC pulses by dividing the output of a 32 KC oscillator by 20. These particular pulses are used in the Mux and Demux buffers at the master station. Similar units are used at the intermediate stations but are not specifically shown.

Figure 11:
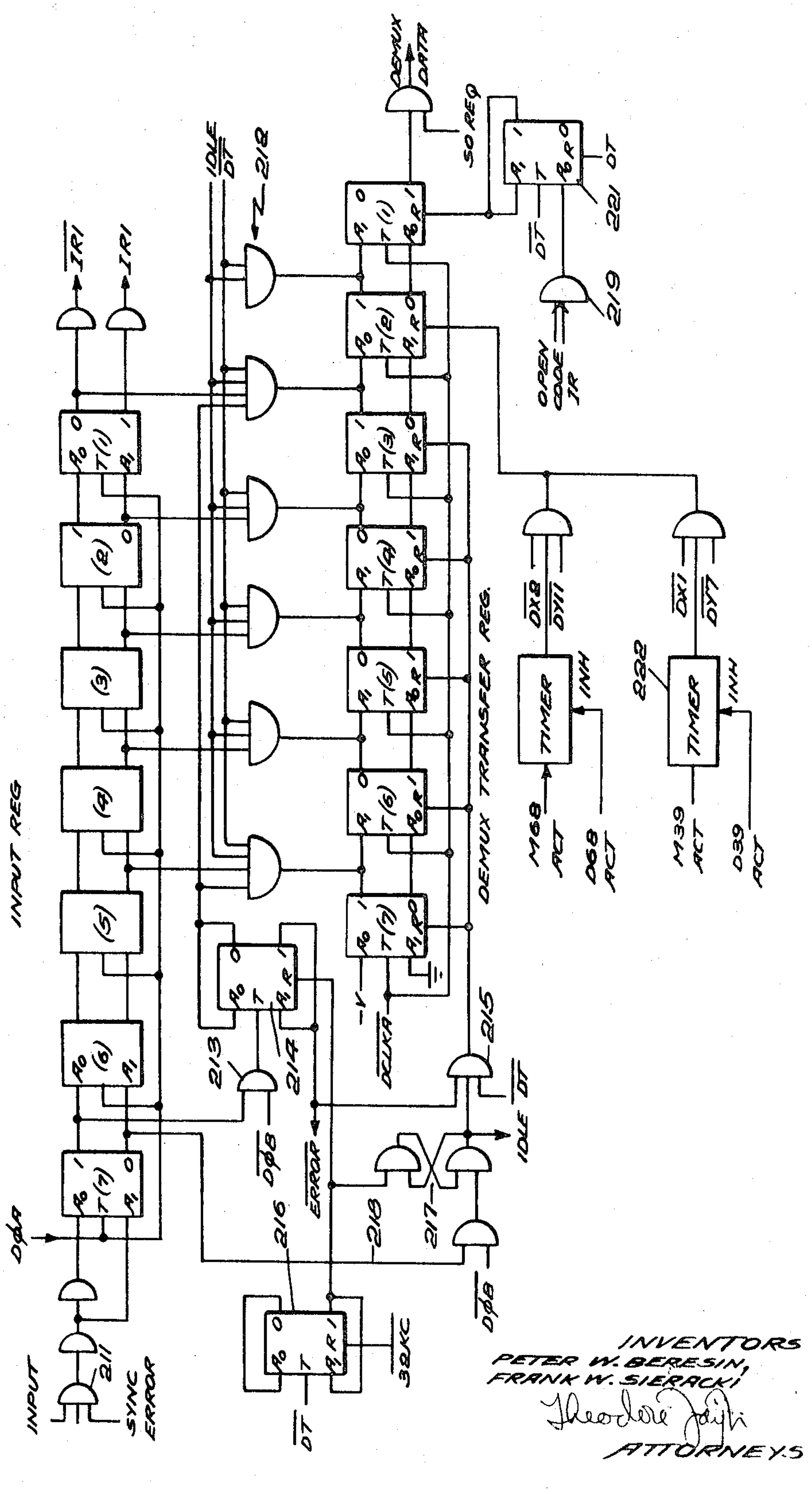

FIG. 11 shows the Demux buffer control at the master station. The INPUT signal from the receiving channel is applied through gate 211 to a seven stage high speed Input Register shifted by DΦA pulses. A SYNC ERROR (FIG. 8) will inhibit the gate and cause idle or mark signals to be supplied to the register. Spaces and 0-bits are low in the input signal and, with the inversion shown, will set the appropriate stages making their 0 outputs low.

The demur transfer register has seven stages, with stage 7 steered toward reset, and shifted by $\overline{DELKA}$. Stage 1 serves as a buffer for the output demux data which is supplied to the TTY buffers (FIG. 7). $\overline{DT}$ enables gates 212 to effect transfer of data from stages 1—5 of the input register to stages 3—7 of the transfer register. $\overline{DT}$ also sets stage 2 for a space. The steering of stage 7 will yield marks after the data shiftout, giving the signal of FIG. 17*j*.

The 1 output of stage 1 of the input register goes through gate 213, strobed by DOB, to a character parity check FF214. Each 1-bit will trigger FF214 and incorrect parity will leave the FF reset. The resultant low $\overline{ERROR}$ output to gate 215 will reset stages 3—7 of the transfer register at $\overline{DT}$ time. The transfer gates to stages 4—6 can only produce a reset, and the high 0 output of FF214 inhibits the gates to stages 3 and 7 to prevent a set, so that shift-out will produce an arbitrary 10001 or Z character in the demux data output.

FF216 will be set at the end of a previous $\overline{DT}$ pulse, and will reset FF214 so that subsequent parity can be ascertained, as will also set FF217 to make IDLE high. A space in the next input character will make line 218 low to reset FF217 by a $\overline{B\Phi S}$ pulse, thus making IDLE low. However, all marks for an idle character will leave IDLE high, and this is used to inhibit transfer gates 212.

The states of the input register corresponding to an open code are applied to gate 219 and steer FF221 to be set by $\overline{DT}$, thus holding stage 1 reset until the next DT, and transmitting spaces on the demux data line.

SO REQ inhibits gate 220 during the course of a switchover operation.

As mentioned above, message cells 39 and 68 are allocated to messages from any station to the others. If they originate at an intermediate station, the messages must be relayed through the master station. This is accomplished by connecting the TTY outputs of the demux buffers (FIG. 7) for cells 39 and 68 to the TTY inputs of the mux buffers (FIG. 6) for the respective cells, in common with the associated receivers and transmitters. If the master station is using the cells, it must delete the characters as the messages return. The circuits at the bottom of FIG. 11 accomplish this.

Whether the master or an intermediate station is using a given cell, say 39, can be determined from the mux and demux active signals. If the master station is using it, M39 ACT is applied to timer 222 whose output to gate 223 goes low for a time exceeding the maximum required for a message to return, say 500 msec. Gate 223 is supplied with $\overline{DX1}$, $\overline{DY7}$, the cell 39 DADD address. Its output goes high at each occurrence of cell 39 and resets stage 2 of the transfer register to deliver all marks to the demux output for the bits of the cell, thereby clearing the cell for insertion of new data. After M39 ACT goes low, indicating cessation of transmission, the output of timer remains low for 500 msec. to be sure to delete the last-transmitted character, and then goes high. If D39 ACT is high, indicating another station is using cell 39, timer 222 is inhibited and no reset of stage 2 occurs. The timer and gate for cell 68 function in the same manner.

Figure 12:
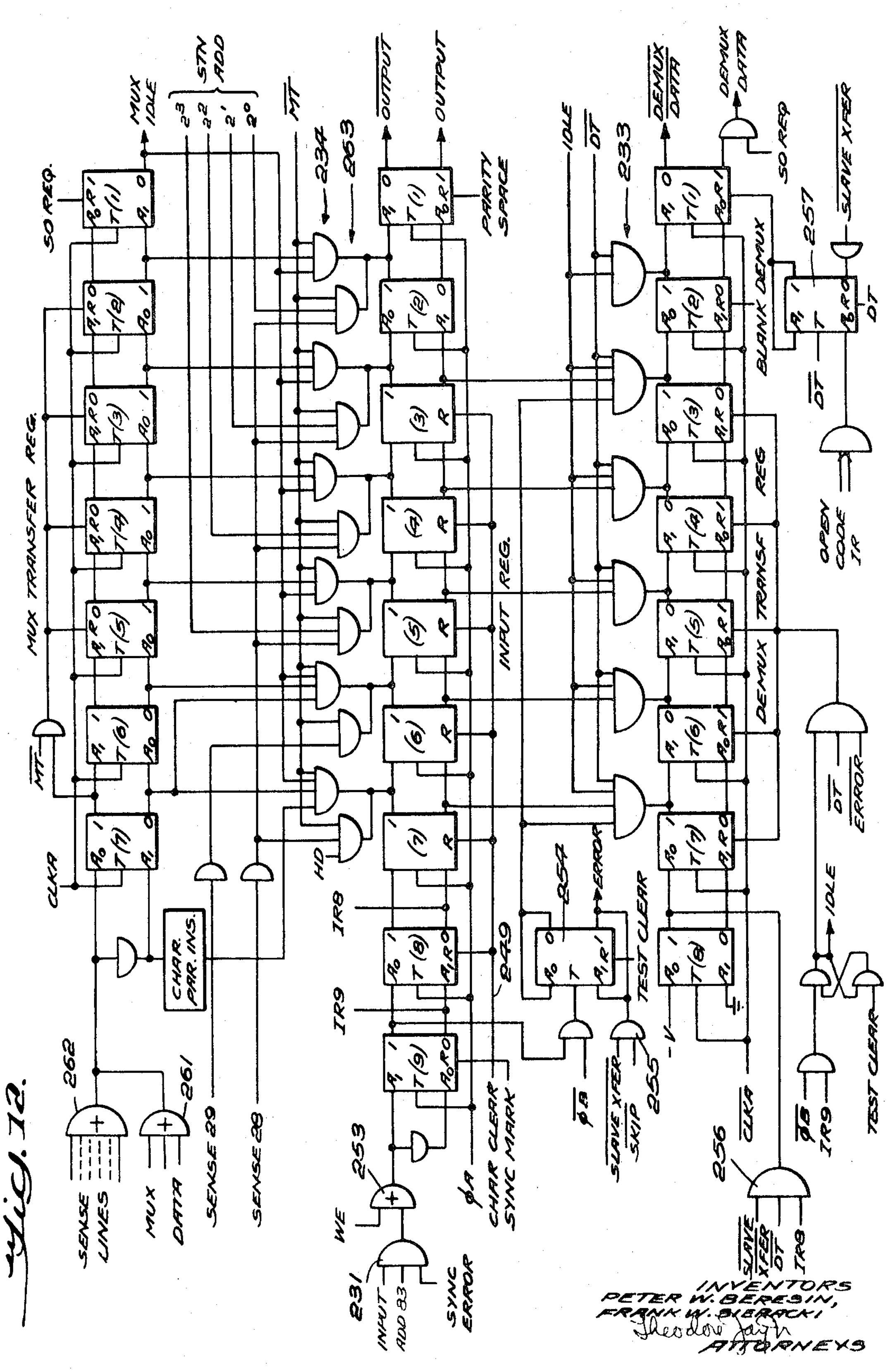
FIGS. 12, 12A show the buffer control at an intermediate station.

FIG. 12 shows the buffer control for an intermediate station. It combines mux and demux functions similar to those of FIGS. 10 and 11 at the master station. An address control is used at each intermediate station, and is the same as that shown in FIG. 8. The D is omitted, since mux and demux use the same address and clock signals.

The Input Register is similar to that of FIG. 11 but with two more stages as in the Output Register of FIG. 10. It is supplied with received messages from the preceding station via INPUT to gate 231, and supplies an OUTPUT for transmission to the succeeding station. The Demux Transfer Register is similar to that of FIG. 11 and receives cell data from the input register via transfer gates 233. The DEMUX DATA output is supplied to associated TTY buffers (FIG. &). The Mux Transfer Register is similar to FIG. 10, and supplies data via transfer gates 234 to the Input register for transmission to succeeding stations.

Since an intermediate station uses only a portion of the message cells, a plug board (not shown) is used which is supplied with the addresses of all the cells via so-called "sense" lines, and selected sense lines are connected to the TTY mux and demux buffers FIGS. 6,7) to supply the selected MADD and DADD addresses.

Before proceeding further, FIG. 12A will be described since it develops signals for FIG. 12. At the top of FIG. 12A $\overline{CC}$, $\overline{SKIP}$, DT, MT and CLK A signals are developed as in FIGS. 10A, 11A, and are shown in FIG. 17*f*, *g* (both inverted), *k*, *m*, and *h*. The slave XFER circuits 235 receive addresses and produce $\overline{SLAVE}$ $\overline{XFER}$ for the proper cell groups as in FIG. 9. These particular slave output employed (not shown) uses clock pulses at bit frequency. $\overline{CLK\ A}$ is supplied to gate 236 along with $\overline{SLAVE}$ $\overline{XFER}$ and selected stage outputs of Transfer cycle 237 to delete four of the 10 pulses and produce six pulses at CLK A frequency for each cell transferred.

Sense lines 26 and 27 correspond to cells 39 and 68 used for interstation communication as described above. The station generating signals in these cells is obligated to delete them upon return and a CHAR CLEAR signal is developed for the purpose. A BLANK DEMUX signal is developed to blank the TTY.

Sense 26 steers FF241 to be set by DT and makes line 242 low to gate 243. Upon occurrence of the following $\overline{MT}$ pulse, the output of gate 244 goes high to reset FF245 and 246, if MUX IDLE is low to indicate the presence of a character to be transmitted. The low 1 output of FF246 to gate 243 accordingly makes BLANK DEMUX high. Line 242 goes low at DT time following sense 26, terminating BLANK DEMUX. The signal is ineffective at this time. However, upon next occurrence of sense 26 and DT, the setting of FF241 immediately produces a high BLANK DEMUX to OR 247 and FF248 is set at the trailing edge of $\overline{DT}$ to produce CHAR. CLEAR (FIG. 17l). This clears the input register through reset line 249 (FIG. 12), prior to the mux transfer at time MT, so that a new character can be entered.

Upon termination of transmission, MUX IDLE goes high and inhibits gate 244. When FF241 is set, gate 251 sets FF245, and the next setting of FF241 causes FF245 to set FF246. This inhibits gate 243. In the meantime BLANK DEMUX and CHAR CLEAR signals will be developed for two messages to insure erasure of the cell 39 contents. A similar blanking circuit 252 is provided for Sense 27 (cell 68) and connected to the BLANK DEMUX line.

In cell 39,68 operation, demux TTY buffer outputs are connected to mux TTY buffer inputs in common with the associated TTY receivers and transmitters, as at the master station. At an intermediate station, the DEMUX ACT line (FIG. 7) is connected to the AUX IN inhibiting line of the mux buffer (FIG. 6) so as to prevent generation of BLANK DEMUX and CHAR CLEAR signals when the data in cells 39,68 originated at another station. With this connection MUX IDLE will remain high while transmissions from another station are being received.

All the other sen lines in use at the station are applied to OR247 to produce CHAR CLEAR signals for the corresponding message cells. TEST CLEAR is developed at each DT occurrence.

Figure 12A:
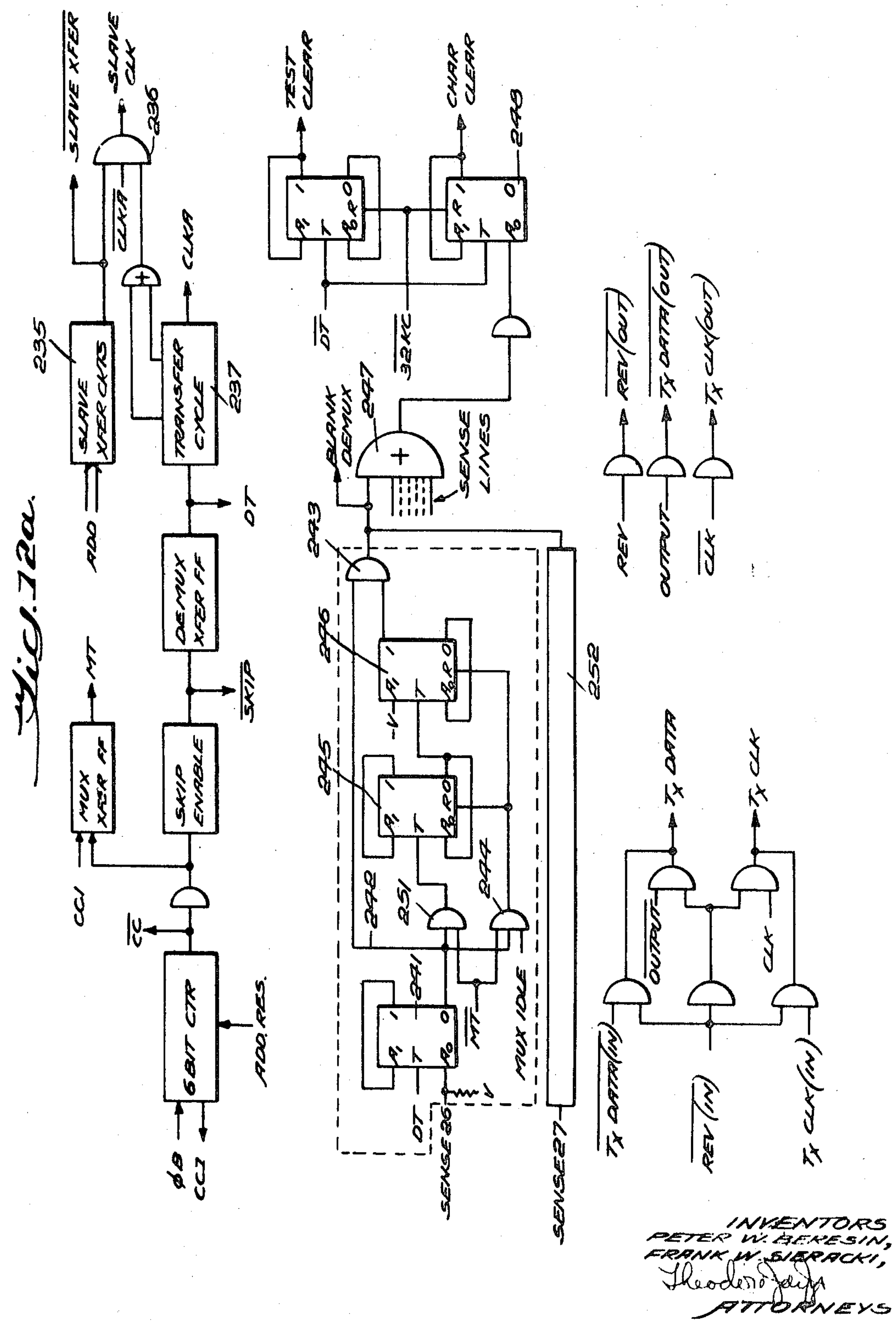

The bottom of FIG. 12A shows the derivation of signals used in switchover and will be discussed later.

Figure 13:
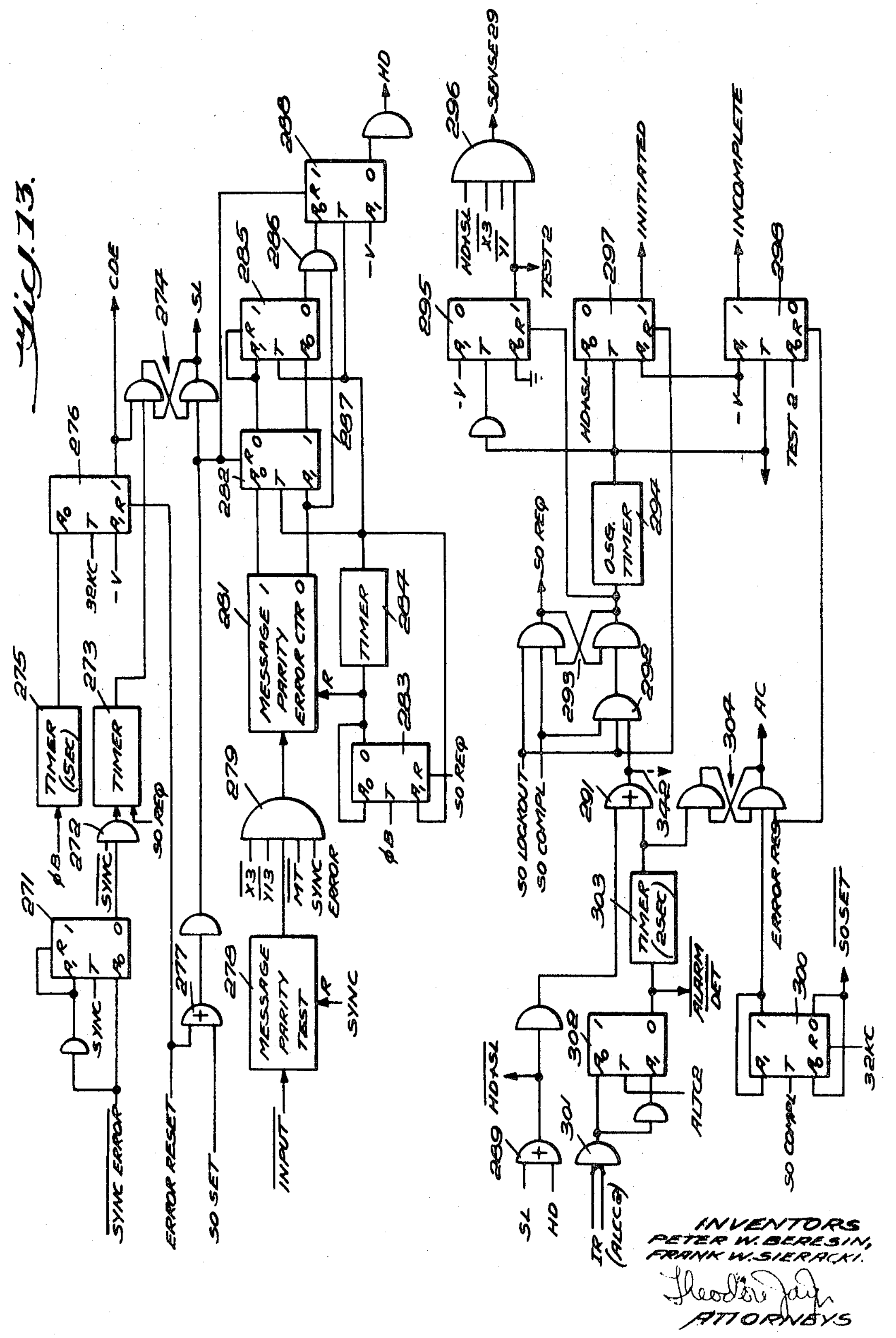
FIG. 13 shows switchover control circuits at master and intermediate stations.

Returning to FIG. 12, ADD 83 inhibits gate 231 to exclude the message parity bits, parity being checked in FIG. 13. A SYNC ERROR inhibits the gate as in FIG. 11. The work end signal WE to OR253 inserts spaces in the register for the sync pattern of the next message, and SYNC MARK resets stage 9 for the 1-bit at the end of the sync pattern. FF254 checks character parity like FF214 in FIG. 11. Character parity is not checked on slave data and gate 255 inhibits checking of these cells.

The timing of data transfers is such that cell addresses are generated when the character parity bit is in stage 9, the demux operation takes place when the parity bit is in stage 8, and mux operation when it is in stage 7. Data is transferred from stages 3—7 of the input register to stages 3—7 of the Demux Transfer Register by gate 233 controlled by $\overline{DT}$ and IDLE as in FIG. 11.

The Demux Transfer Register has an additional stage 8 which normally steers stage 7 as in FIG. 11. Message cells used for slave transmissions have data in the sixth bit positions rather than parity bits. Stage 8 of the input register contains this bit, and IR8 to gate 256 sets stage 8 of the Demux Transfer register as required, at $\overline{DT}$ time. $\overline{SLAVE}$ $\overline{XPER}$ confines operation to the proper message cells.

Resetting of stage 1 by FF257 for an open code is like FIG. 11. However $\overline{SLAVE}$ $\overline{XFER}$ inhibits operation for slave data cells. The resetting for idle and error conditions is like FIG. 11 Stage 2 is reset by BLANK DEMUX to prevent a duplicate transfer of information to the TTY for cells 39, 68, as explained above.

For Mux operation, MUX DATA is applied to OR61, and the Sense lines in use are applied to OR262. The outputs are joined and supplied to the Mux Transfer Register. The Mux buffers are connected in groups to OR261 so that a failure in one will not affect all. OR262 prevents the supply of mux data to the transfer register unless a sense line is high, to avoid possible erasure of other message cells by an erroneous mux transfer. The mux transfer register is similar to that of FIG. 10. Here, however, stage 1 is reset by SO REQ (switchover required) rather than SLAVE XFER. Slave data is not inserted at an intermediate station and transfer need not be inhibited. However, during a switchover operation transfer is inhibited until the switchover is accomplished. Normal transfer is by the upper row of gates 234 as described for FIG. 10. The lower row 263 functions during switchover.

Sense 28 corresponds to alarm cell 1 or 2, as described later, and sense 29 corresponds to alarm cell 2. They are developed in FIGS. 13 and 14 when switchover is required. The STN ADD $2^0$—$2^3$ lines are coded to give the address assigned to the particular station. These are applied to transfer gates 263 to introduce the proper codes in the Input Register. The codes are given below. HD introduces a bit to indicate a high distortion condition.

SWITCHOVER CONTROL

Figure 3:
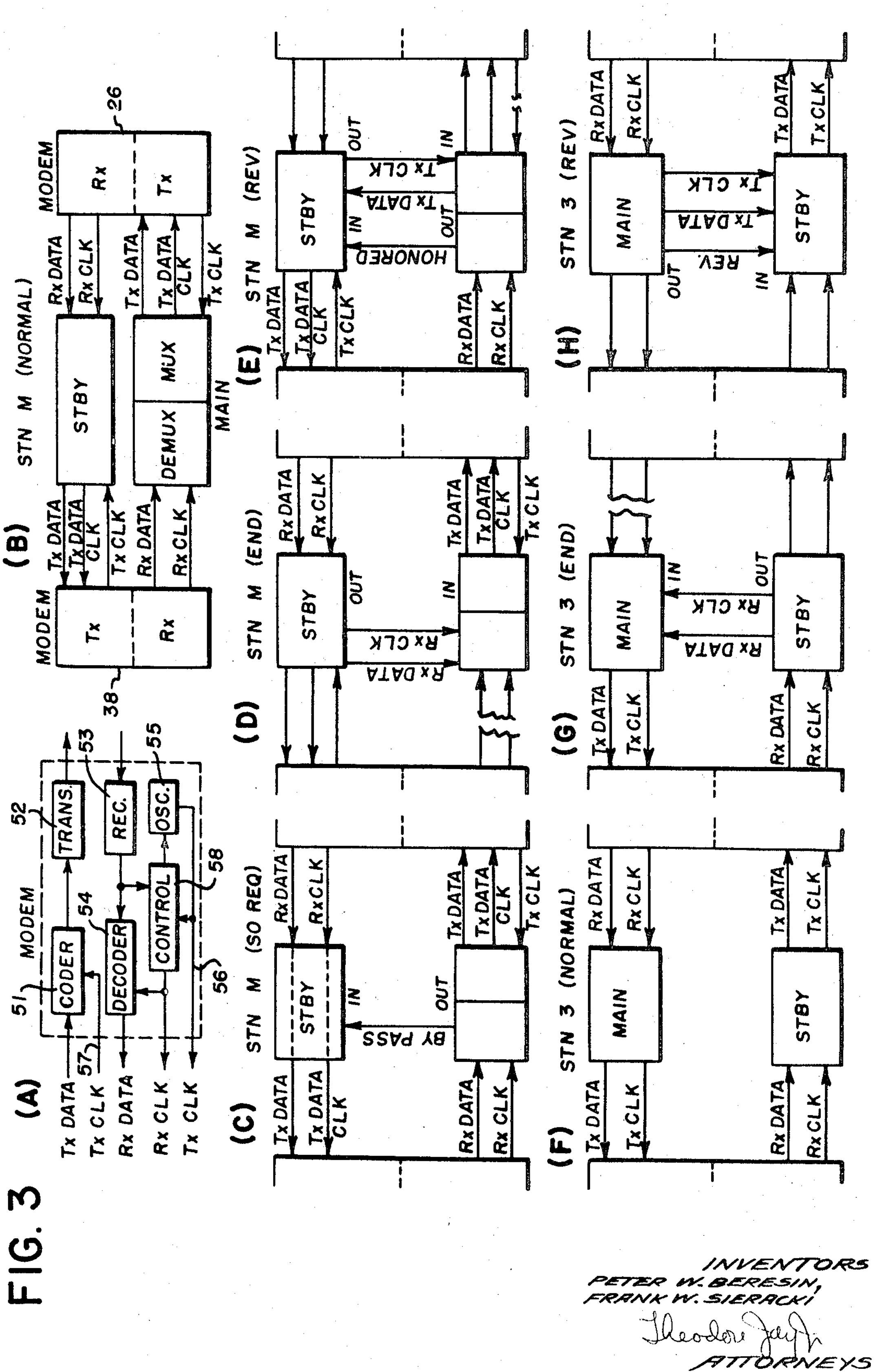
FIG. 3 illustrates a modem, and modem and channel interconnections under switchover conditions.

The remaining FIGS. deal primarily with switchover control circuits, although parts apply to normal operation, Overall switchover operation has been described in connection with FIGS. 2 and 3.

The following table gives the alarm cell contents during the several steps involved in switchover.

TABLE I

| Step | Initiated by— | Alarm cell 1 | Alarm cell 2 |
|---|---|---|---|
| 1 | End STN | End STN code | Alarm code. |
| 2 | Master STN | Rev. STN code. | Do. |
| 3 | Reverse STN | | Rev. STN code. |
| 4 | Master STN | | SO compl. code. |

The particular codes used are given in the table below.

TABLE II

| Code Bits | 6 | 5 | 4 | 3 | 2 | 1 |
|---|---|---|---|---|---|---|
| STN M | Y | 1 | X | 0 | 0 | 0 |
| STN #1 | Y | 1 | X | 0 | 0 | 1 |
| STN #2 | Y | 1 | X | 0 | 1 | 0 |
| STN #3 | Y | 1 | X | 0 | 1 | 1 |
| STN #4 | Y | 1 | X | 1 | 0 | 0 |
| STN #5 | Y | 1 | X | 1 | 0 | 1 |
| Alarm code | 0 | 0 | 1 | 1 | 1 | 1 |
| SO compl | 0 | 0 | 1 | 1 | 0 | 0 |

X=0 in Main Logic: X=1 in Standby Logic; X=0 for Sync Lost Error; Y=1 for High Distortion Error.

Concerning the difference in X for main and standby channels, inasmuch as the logic in the two channels is the same, stations in both channels may detect a line failure but they will be different stations since transmission is in opposite directions. The opposite coding of bit X distinguishes the station addresses, so that main channel addresses will control.

A line failure requiring switchover may be due to high signal distortion HD resulting in faulty messages, or a line break resulting in no messages and consequently sync loss SL. HD may be defined as desired, but here is selected as a maximum number of message parity errors (say 2 to 8 as desired) in three consecutive 30 second intervals. A sync loss condition may also be defined as desired, but here is selected as loss of sync for a predetermined timing period (say 15 seconds to several minutes as desired).

Referring to FIG. 13, a low $\overline{\text{SYNC}}$ $\overline{\text{ERROR}}$ produced in FIG. 8 for the master station, and similarly for an intermediate station, will reset FF 271 through its R input. The high 0 output will inhibit gate 272, allowing timeout to begin in timer 273. The timer output will go high at the end of the timing period unless its input again goes high. If sync fails, at the end of the timing period FF274 will be set to produce a high SL signal. If only one sync is lost, two more syncs are required to retrigger the timer. The first will reset the sync error FF 158 (FIG. 8) giving a high $\overline{\text{SYNC}}$ $\overline{\text{ERROR}}$. This steers FF 271 to be set by the second SYNC signal. The low O output to gate 272, with a low $\overline{\text{SYNC}}$, will retrigger timer 273 and cause its output to go low.

If the main channel R*x* Modem should fail, $\Phi$B will fail (FIG. 14), and no message can be received. Thus $\Phi$B is applied to a short period timer 275 (say 1 second) and, upon failure, FF276 is set. This produces a high CDE, and also sets FF274 to produce a high SL.

A manually produced ERROR RESET resets FF276 and, through OR277, resets FF274. When switchover is complete, SO SET to OR277 resets FF274.

$\overline{\text{INPUT}}$ is applied to a message parity test circuit 278 which is reset for each message by SYNC. An error to gate 279, with the other signals shown, gives a high gate output unless inhibited by a SYNC ERROR. Counter 281 counts the errors to a selected maximum and steers FF282 toward set if the maximum is reached. FF283 is initially reset, and resets the counter and holds the input of timer 284 high. A $\Phi$B sets FF283 to release the counter and start the timer. At the end of the timing interval, the timer output goes high to set FF282 and steer FF283 to be reset by $\Phi$B, whereupon a new timing period will start. If the maximum count is again reached, FF285 will be set to enable gate 286 and a third timing period will occur. A third maximum count will make line 287 low to set FF288, yielding a high HD.

If a maximum count is not reached in the second timing period, FF282 will be reset, and also FF285 through its R input. If a maximum count is not reached in the third timing period, line 287 will be high and FF282 and 285 reset as before. An SO REQ signal will hold FF283 reset while switchover is taking place.

Either a high SL or HD to OR289, through an inverter, OR291 and gate 292 will set FF293 to yield a high SO REQ and start OSC TIMER 294. The timer is arranged to give an output which remains low for 15 seconds, and then alternately goes high and low at 12 second intervals until stopped by the resetting of FF293. See FIG. **18*f***. Resetting is by SO COMPL at the end of switchover. A manual SO LOCKOUT SWITCHOVER prohibits a switchover operation if this is desired.

Figure 18:
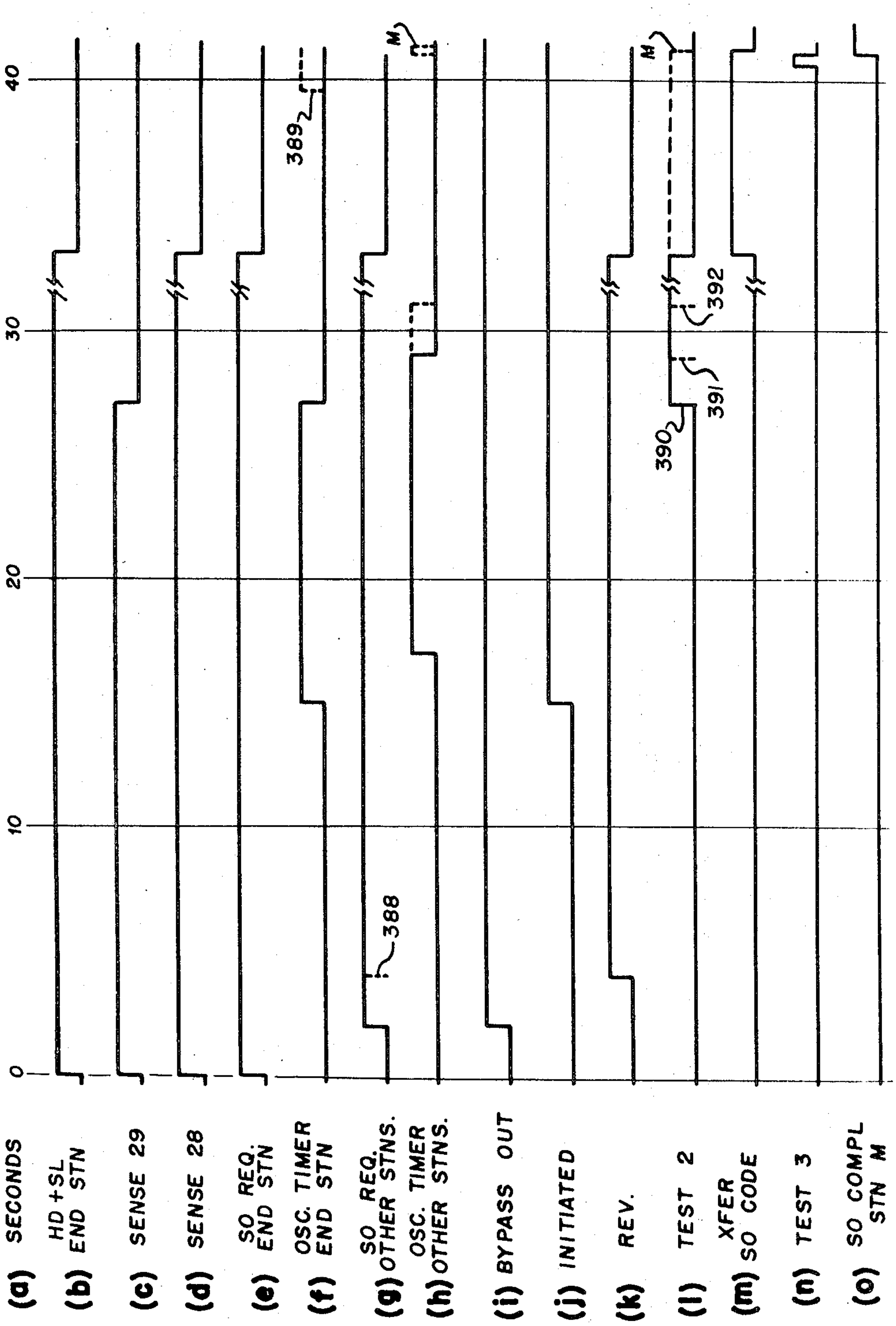

Initially FF295 is reset and gives a low 1 output to gate 296. The inputs shown will cause SENSE 29 to go high at Alarm cell 2 time (FIG. **18*c*). At the end of the first 15 second period, FF297 is set to produce a high INITIATED signal (FIG. 18*j*). At the end of the next 12 second period, the inverted timer output sets FF295, producing a high TEST 2 signal (FIG. 18*l*) and inhibiting gate 296 to terminate Sense 29. It may be mentioned that Sense 29 in FIG. 18, and also Sense 28, should be serrated since they occur only once for each message, but the time scale does not permit showing this. If timer 294 is not inhibited by SO COMPL by the end of the second 12 second period, FF298** is set to produce an INCOMPLETE signal for a suitable indicator.

With HD or SL developed as described, the particular station will become an end station. In such case, Sense 29 in FIG. 12 will insert the Alarm code in the input Register during Alarm cell 2, and the message will pass to succeeding stations. Sense 28 will insert the end station code in cell 1, as will be described.

The remainder of FIG. 13 relates to the functioning as a receiver of the alarm code. IR inputs from data stages of the Input Register of FIG. 12, selected to be all low for the alarm code, are supplied to gate 301 and FF302 will be set by ALTC2 (Alarm Test Cell 2) if the code is present in the cell 2 interval. This produces a low $\overline{\text{ALARM}}$ $\overline{\text{DET}}$ signal and starts a 2-second Timer 303. If the alarm code persists for 2 seconds, the timer output to OR291 sets FF293 to produce a high SO REQ, and the subsequent operation will ensue as above described, except 2 seconds later as indicated by the dotted line in FIG. 18*g*. FIG. 18*h* shows the oscillator timer in full lines for stations back to the master station. FF304 will be actuated to give a high AC (Alarm Code) signal for suitable indication. Upon eventual completion of switchover, and SO COMPL signal to FF300 will set it to give a low SO SET signal, and will reset FF304. A manual ERROR RESET will reset FF304 and also FF298.

Figure 14:
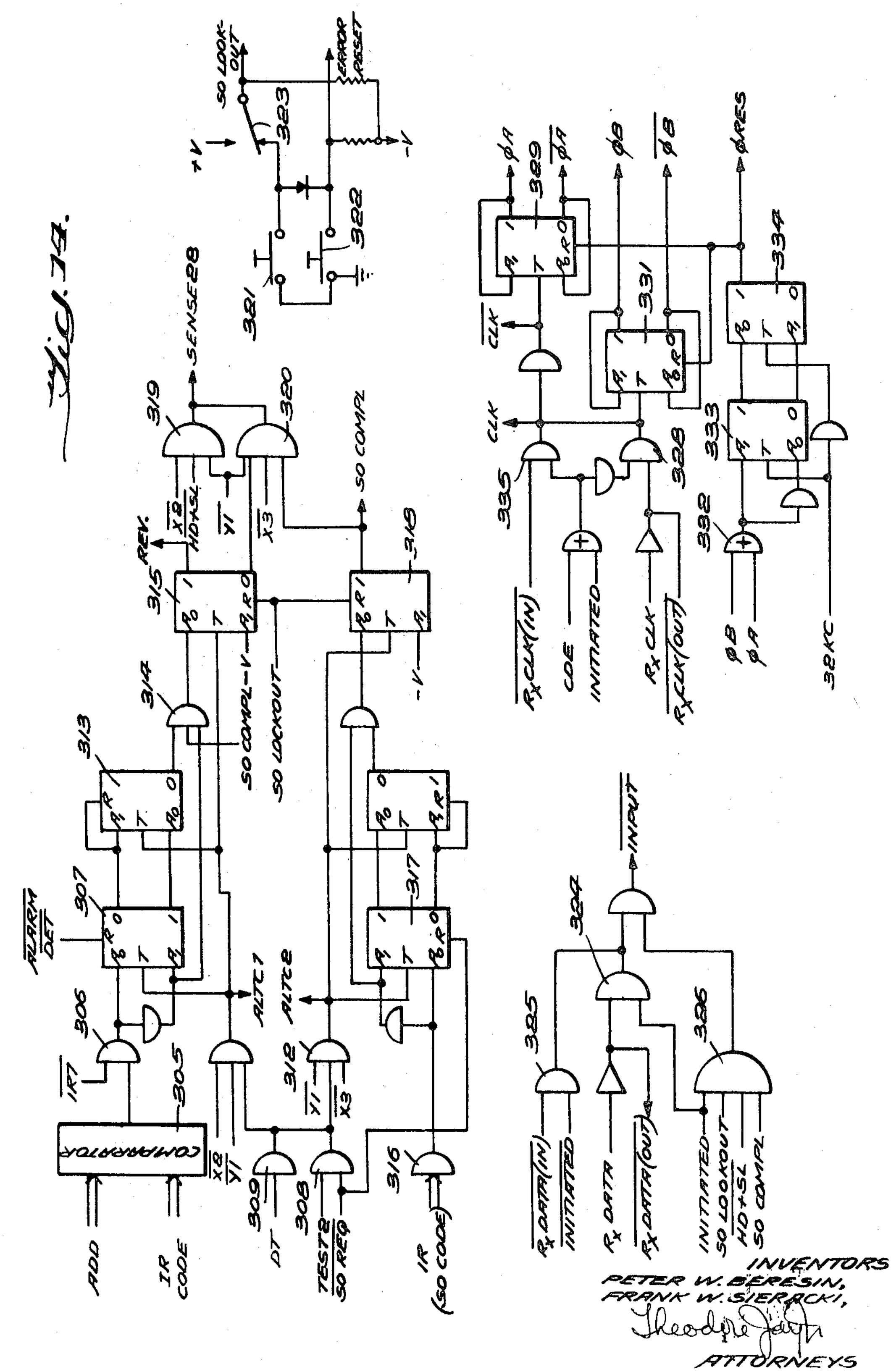
FIG. 14 shows additional switchover circuits at an intermediate station and FIGS. 15, 16 show additional switchover circuits at the master station.

Referring to FIG. 14, a reverse station comparator 305 is supplied with IR outputs from stages of the input Register and locally generated coded station address in accordance with Table II. Gate 306, supplied with IR7, distinguishes the fifth bit position. FF307 is steered toward set when the station code is recognized. Gates 308 and 309 enable gates 311 and 312 at DT time before the SO REQ FF is set, and also during TEST 2. Gates 311, 312 are enabled during alarm cells 1 and 2, respectively. Alarm DET releases FF307 if the alarm code has been recognized in coil 2, and ALTC 1 sets FF307 if the station code is recognized. Recognition in three successive messages is desired before taking action. FF307, FF313 and gate 314 are connected like 282, 285, 286 in FIG. 13 to trigger FF315 upon such recognition and produce a high REV signal.

Gate 316 is supplied with the proper IR signals to recognize the SO complete code of Table 11 and steers FF317 to be set by ALTC 2 at alarm cell 2 time when released by 50 REQ. If recognized in three successive messages, FF318 is set to produce a high SO COMPL.

Gates 319, 320 produce Sense 28 at alarm cell 1 time if MD or SL is produced locally (end station) and at alarm cell 2 time when REV is generated (reverse station) in accordance with Table 1. Sense 28 is used in FIG. 12, along with the station address code, to insert the code in the proper cell.

Switch 321 is the master reset switch which manually restores normal operation after the faulty conditions causing switchover have been corrected. Switch 322 is the Error Reset Switch which is actuated after after switchover is established to clear error indications and reestablish switchover circuits, but allows switchover operation to continue. If for any reason it is desired to prevent a switchover, switch 323 is thrown to its upper position. Similar switches are provided at each station.

The circuits in the lower half of FIG. 14 shows the development of various signals for normal and switchover operations. For normal operation, INITIATED to gate 324 will be low and R*x* Data from the receive modem in the main channel will produce INPUT for the input register of FIG. 12. For end station operation with INITIATED high and INITIATED low, gate 324 will be inhibited and gate 325 will supply R*x* DATA (IN) for INPUT. Gate 326 inhibits gate 330 until the end station FF is set at the end of the first 15 second interval to develop a high INITIATED.

Normally R*x*CLK to gate 328 is used for CLK. CLK to FF329 produces ΦA and CLK to FF331 produces ΦB. These signals to OR332 steer FF333 to be set by 32 KC, and then FF334 is set to produce ΦRES. This resets FFs 329, 331 The signals are shown in FIG. 17*b—e*. For end station operation, OR336 inhibits gate 328 and enables gate 335 so that R*x*CLK(IN) is used.

Figure 15:
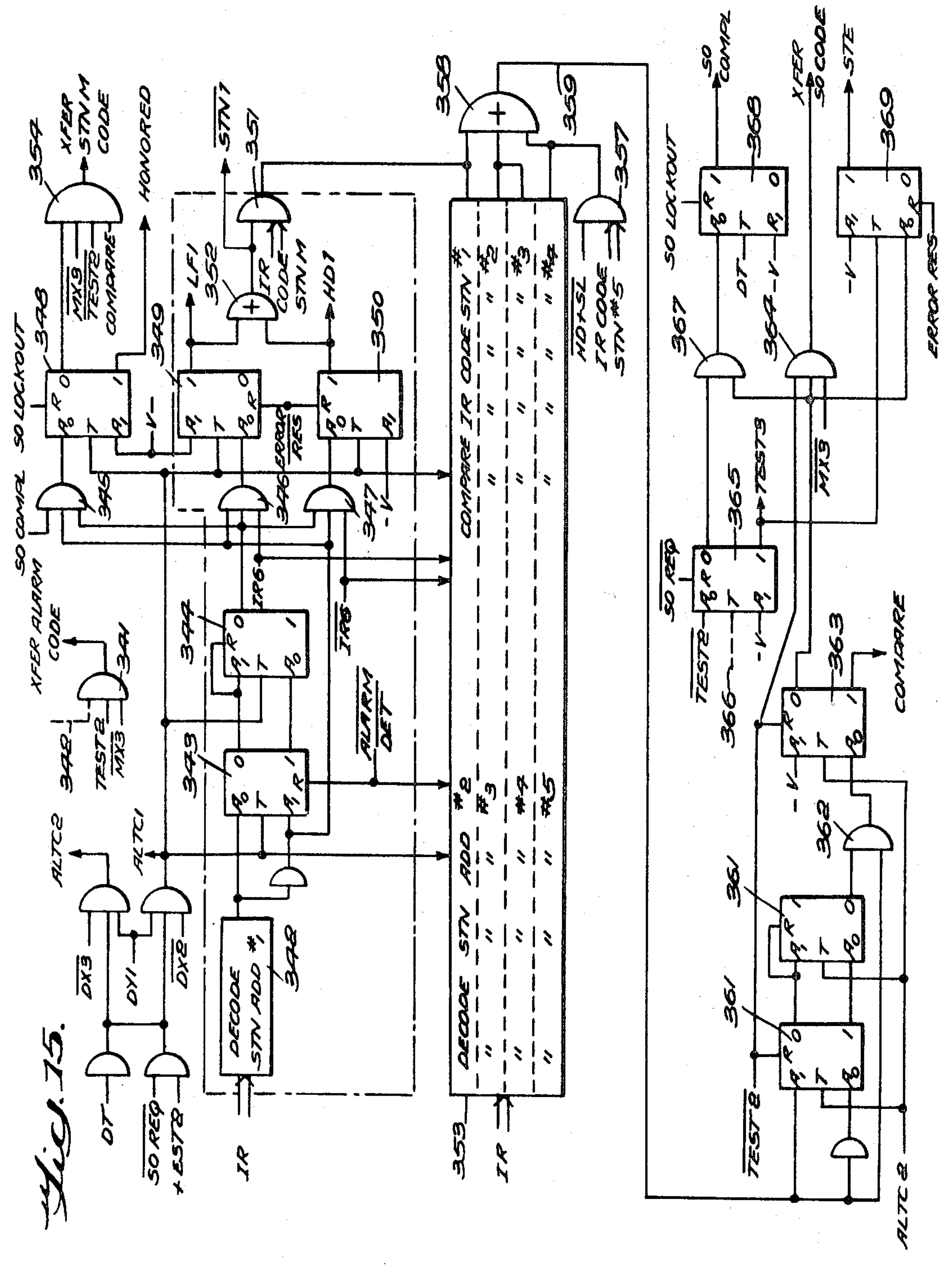

The switchover circuits at the master station include those shown in FIG. 13. Additionally, they include those shown in FIG. 15. Also, certain circuits used in switchover are shown in FIG. 10. Referring to FIG. 15, ALTC1 and ALTC2 are produced as in FIG. 14. Gate 340 has an input 341 from FIG. 13. If HD or SL is detected locally, XFER ALARM CODE is immediately generated in alarm cell 2. If switchover is initiated elsewhere, 2 seconds after receipt of the message the transfer signal is developed. In either case, the signal terminates when Test 2 goes high.

IR signals from the demux input register (FIG. 11) are supplied to decoder 342 to recognize the address of station 01. The output of the decoder is supplied to detector FF*s* 343, 344 functioning like FF*s* 282, 285 in FIG. 13. If the station address is recognized three times in alarm cell 1, gates 345—347 produce high outputs to FF*s* 348—350, when the other inputs are enabling. ALTC1 is applied to the T-inputs. If IR6 to gate 347 is low indicating an HD code in the message, FF350 is set. If IR6 to gate 346 is low, indicating sync loss, FF349 is set. The setting of either FF will enable gate 351 through OR352. The output of OR352 is designated STN1. The signals LF1 and HD1 are used for indication.

Similar circuits are provided for the other stations, as indicated by box 353. STN2, STN3, STN 4 and STN5 are produced in the same manner as STN1, for respective stations, but are not specifically shown. To send out the reverse station code in alarm cell 1 (Step 2, Table 1), the master station sends out the code for the station preceding that decoded in 342 or in 353. If STN1 is decoded, the master sends out its own code. In this instance step 2 is omitted and the master code is sent out in alarm cell 2 (step 3) during the Test 2 period (FIG. 18*l*). FF348 is set at cell 1 time making HONORED high and enabling gate 354. The gate is supplied with MX3 to develop XFER STN M CODE.

These signals are used in FIG. 10. Gates 355 are supplied with the signals shown and are gated by MX2 during alarm cell 1 time. The outputs are collected by OR gates 366 which are connected to various transfer gates in the lower row 177. The combinations are selected so that STN3 inserts the code of station 2, STN5 inserts the code of station 4, etc. If the master station detects HO + SL, this signal inserts the code of station 5, XPER STN M CODE is applied to OR gates 366 during alarm cell 2 time and inserts the code of the master station. XFER ALARM CODE to OR gates 366 inserts the alarm code during cell 2 prior to the TEST 2 period. XFER SO CODE, when developed, inserts the SO COMPL CODE.

As already described, when a reverse station receives its address in alarm cell 1, it substitutes its own station code address for the alarm code in alarm cell 2 (Table I, step 3). This is then checked at the master station.

Returning to FIG. 15, gate 351 is supplied with the STN M code, since the station precedes STN 1 being detected in 3 and 2. Upon receipt of a message containing the STN M code, the output of 351 goes high to indicate a proper comparison has been obtained. Like gates in box 353 are supplied with the codes of the stations proceeding that detected. If STN M is the end station, the code of preceding station 5 applied to gate 357 effects the comparison.

The outputs of the compare gates are collected by OR358 and line 359 will go low when comparison is obtained. FF 361, gate 362 and FF363 function as a three-time detector similar to those previously described. Three consecutive comparisons will set FF363, producing a high COMPARE and enabling gate 364. MX3 selects alarm cell 2 and a high XFER SO CODE is developed which transmits the SO COMPL CODE as described for FIG. 10.

Test is applied to FF365. The output of the oscillator timer at the master station corresponding to 294 in FIG. 13 is connected through line 366 to the T-input, and when it goes high at the end of the second 12-second interval it sets FF365 to produce TEST 3. If comparison is satisfactory at this time, gate 367 steers FF368 to be set by DT, thereby giving a high SO COMPL. This resets the So REQ FF and signifies the end of the switchover operation. If at this time proper comparison has not resulted, FF369 will be set to give a high STE indicating that switchover has failed.

FIG. 16 shows the derivation of signals at the master station for normal and switchover operations. FIG. 3 shows the use of the signals under various conditions.

For normal operation, OUTPUT to gate 371 passes gate 372 to form T*x* Data. R*x* Data passes gates 373, 375 to form INPUT. T*x* CLK passes gate 376 and is inverted to yield MCLK. This produces MΦA, MΦB and MΦRES by circuits as described for FIG. 14. T*x*CLK is also inverted to gate 377 to form T*x* DATA CLK. R*x* CLK passes gate 378 to form DCLK, and the various DΦ signals are derived therefrom.

For switchover upon SO REQ (FIG. 3C), SO REQ and then SO COMPL to OR379 in the main logic produces BYPASS OUT. In the standby logic BYPASS (IN) through gate 381, inverted to gate 382, enables the gate to pass R*x* DATA through gate 372 to form $\overline{\text{Tx DATA}}$. $\overline{\text{BY PASS (IN)}}$ through gate 381, inverted to gate 382, enables the gate to pass $\overline{\text{Rx CLK}}$ to form $\overline{\text{Ix DATA CLK}}$.

For end station operation (FIG. 3D), a low $\overline{\text{INITIATED}}$ to gate 383 enables $\overline{\text{Rx DATA (IN)}}$ to yield $\overline{\text{INPUT}}$. Gate 373 is inhibited by INITIATED. $\overline{\text{H + SL}}$ operate gate 374 to inhibit gate 375 for the first 15 seconds of the switchover operation, at which time INITIATED goes high to remove the inhibition. $\overline{\text{RxCLK(IN)}}$ to gate 384 yields $\overline{\text{DCLK}}$. INITIATED or CDE to OR385 blocks gate 378.

For reverse station operation (FIG. 3E), HONORED produces $\overline{\text{HONORED(OUT)}}$. OUTPUT through gates 371, 372 yields Tx DATA (OUT). In the standby, $\overline{\text{HONORED(IN)}}$ blocks gate 372 to inhibit its own OUTPUT data, and enables gate 386 to pass $\overline{\text{Tx DATA (IN)}}$ to yield TxDATA. $\overline{\text{Tx CLK(IN)}}$ to the main logic passes gate 387 and is inverted to yield $\overline{\text{MCLK}}$.

Similar circuits at the intermediate stations are shown in FIGS. 12A and 14, and further detailed description is believed unnecessary.

Figure 17:
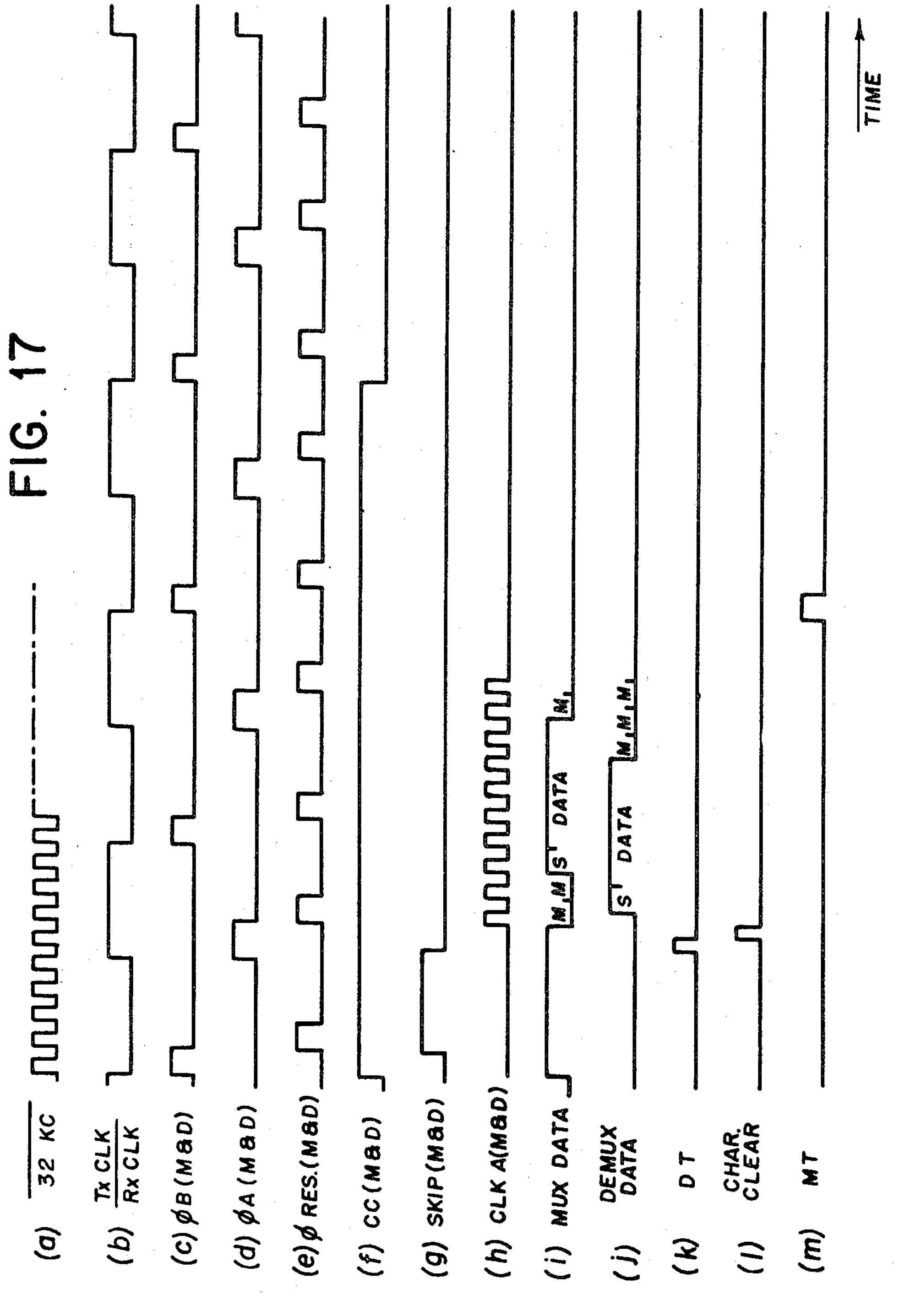
FIGS. 17 and 18 show waveforms explanatory of normal and switchover operations.

The waveforms of FIG. 17 have been referred to during the course of the description, and further description is believed unnecessary.

In FIG. 18, a few additional remarks may be made. SO REQ in *g* starts 2 seconds later than in *e* due to the 2-second timer 303 in FIG. 13, for stations back to the master. After retransmission by the master, subsequent stations take an additional 2 seconds as indicated by dotted line 388. The same is true for *h* as compared to *f*. In *f* the dotted line 389 indicates a further period of oscillation if the timer is not reset. Test 2 in *l* is initiated at 390 at the end stations back to the master, and at 392 for subsequent stations.

XFER SO CODE at *m* caused the SO COMPL CODE to be transmitted by the master. When received at an intermediate station, an SO COMPL is produced (FIG. 14) and resets the SO REQ FF293 (FIG. 13). This terminates the waveforms shown at *b*, *d*, *c*, *g*, *k* and *l* at each station. The exact time depends on the time required for the modems and logic to settle down in the switchover made, and hence breaks in the lines are shown.

At the master station, the osc, timer and TEST 2 continue until TEST 3 is developed *n* and then SO COMPL, the latter resetting the SO REQ FF. This is indicated by the dotted pulse M in *h*, and M in *l*.

In the apparatus described various indicator circuits are employed to inform operators at the various stations of any malfunctionings which arise. These have been omitted to avoid further complexity.

The invention has been described in connection with a specific embodiment thereof in which specific circuits and arrangements have been shown to perform the operations described. It will be understood that the detailed circuitry shown may be modified as meets the desires of those skilled in the art. Also, particular features may be used and others omitted, as meets the requirements of a particular application.

I claim:

1. A digital communication system comprising:

sending and receiving stations and an intermediate station;

b. a communication channel serially connecting said stations for transmission of digitally coded multiplex messages;

c. each message including a distinctive sync pattern and a plurality of character cells each containing a plurality of bit intervals;

d. means for transmitting said multiplex messages alternatively at a higher and at a lower bit rate;

e. multiplexing and demultiplexing means at said intermediate station for inserting data in said cells and deriving data therefrom;

f. counting means at said stations for counting said cells and producing corresponding cell addresses;

g. means responsive to said cell addresses for controlling said multiplexing and demultiplexing means, and h. skip means operative upon transmission of messages at said lower bit rate to advance said counting means rapidly at predetermined counts thereof to effectively skip predetermined cell addresses.

2. A system according to claim 1 including:

a. message register means at said intermediate station for receiving said multiplex messages and transmitting corresponding messages;

b. multiplex shift register means in said multiplexing means for receiving character data to be inserted in said messages:

c. demultiplex shift register means in said demultiplexing means for receiving data from said messages;

d. means for actuating said skip means in a skip interval allocated to the beginning of a cell interval:

e. means for transferring data from said message register means to said demultiplex shift register means in a demux transfer interval following said skip interval;

f. means for shifting character data into said multiplex shift register means and means for shifting character data out of said demultiplex shift register means during a clock interval following said demux interval;

g. and means for transferring data from said multiplex shift register means to said message register means in a mux transfer interval following said clock interval; and h. said skip, demux, transfer, clock and mux transfer intervals being predetermined to occur during the presence of the corresponding cell in said message register means.